United States Patent
Lee et al.

(10) Patent No.: US 9,807,151 B2
(45) Date of Patent: Oct. 31, 2017

(54) METHOD AND ELECTRONIC DEVICE FOR SENDING AND RECEIVING DATA

(71) Applicant: Samsung Electronics Co., Ltd., Suwon-si, Gyeonggi-do (KR)

(72) Inventors: Tae-Young Lee, Seoul (KR); Jae-Eun Kang, Suwon-si (KR); Myoung-Hwan Lee, Suwon-si (KR); Chun-Ho Lee, Seongnam-si (KR); Chil-Youl Yang, Anyang-si (KR); Hyun-Gyoo Yook, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 14/185,275

(22) Filed: Feb. 20, 2014

(65) Prior Publication Data
US 2014/0237048 A1   Aug. 21, 2014

(30) Foreign Application Priority Data

Feb. 20, 2013   (KR) .................. 10-2013-0018134
Mar. 4, 2013   (KR) .................. 10-2013-0022940

(51) Int. Cl.
*H04L 29/08* (2006.01)
*H04M 1/725* (2006.01)
(Continued)

(52) U.S. Cl.
CPC .............. *H04L 67/10* (2013.01); *G06F 3/038* (2013.01); *G06F 9/54* (2013.01); *H04M 1/72519* (2013.01); *G06F 3/123* (2013.01); *G06F 8/65* (2013.01); *G06F 2203/0383* (2013.01); *G06F 2209/545* (2013.01)

(58) Field of Classification Search
CPC ... G06F 3/123; G06F 8/65; G06F 8/68; H04L 67/10
See application file for complete search history.

(56) References Cited

U.S. PATENT DOCUMENTS

| 9,448,691 B2 * | 9/2016 | Suda ..................... G06F 3/0488 |
| 2003/0053475 A1 * | 3/2003 | Veeraraghavan ......... H04L 1/22 370/431 |

(Continued)

FOREIGN PATENT DOCUMENTS

| CN | 1914865 A | 2/2007 |
| CN | 101783834 A | 7/2010 |

(Continued)

*Primary Examiner* — Jeong S Park
(74) *Attorney, Agent, or Firm* — Jefferson IP Law, LLP

(57) ABSTRACT

A method and an electronic device for sending and receiving data are provided. The method of the electronic device for sending and receiving data includes detecting a communication event of other electronic device, if detecting the communication event, sending information of an application running on the electronic device, to the other electronic device, receiving information of an application running on the other electronic device, from the other electronic device, determining an application execution screen by comparing the application information of the electronic device with the application information received from the other electronic device, and displaying the determined application execution screen.

16 Claims, 19 Drawing Sheets

(51) Int. Cl.
*G06F 9/54* (2006.01)
*G06F 3/038* (2013.01)
*G06F 9/445* (2006.01)
*G06F 3/12* (2006.01)

(56) References Cited

U.S. PATENT DOCUMENTS

| | | | |
|---|---|---|---|
| 2005/0198029 A1 | 9/2005 | Pohja et al. | |
| 2005/0273780 A1* | 12/2005 | Torvinen | G06F 21/121 |
| | | | 717/171 |
| 2007/0169104 A1* | 7/2007 | Morita | G06F 8/65 |
| | | | 717/170 |
| 2008/0136831 A1* | 6/2008 | Kim | G09G 5/00 |
| | | | 345/537 |
| 2008/0256468 A1 | 10/2008 | Peters et al. | |
| 2008/0310632 A1 | 12/2008 | Nammoto | |
| 2009/0248820 A1 | 10/2009 | Basir et al. | |
| 2010/0227610 A1* | 9/2010 | Jabara | G06Q 10/10 |
| | | | 455/432.3 |
| 2011/0068902 A1* | 3/2011 | Lim | G08C 17/02 |
| | | | 340/10.1 |
| 2011/0107322 A1* | 5/2011 | Hashiguchi | G06F 8/65 |
| | | | 717/170 |
| 2011/0124327 A1 | 5/2011 | Balasaygun et al. | |
| 2011/0283334 A1 | 11/2011 | Choi et al. | |
| 2012/0015728 A1* | 1/2012 | Sakiyama | A63F 13/10 |
| | | | 463/31 |
| 2012/0036218 A1 | 2/2012 | Oh et al. | |
| 2012/0046054 A1 | 2/2012 | Celik | |
| 2012/0159472 A1 | 6/2012 | Hong et al. | |
| 2012/0287034 A1 | 11/2012 | Park et al. | |
| 2012/0299814 A1 | 11/2012 | Kwon et al. | |
| 2012/0324032 A1 | 12/2012 | Chan | |
| 2013/0013419 A1 | 1/2013 | Sim et al. | |
| 2014/0038718 A1* | 2/2014 | Kothari | G06F 9/44526 |
| | | | 463/40 |
| 2014/0232815 A1* | 8/2014 | Cili | H04M 1/72597 |
| | | | 348/14.08 |

FOREIGN PATENT DOCUMENTS

| | | |
|---|---|---|
| CN | 102244676 A | 11/2011 |
| CN | 102572096 A | 7/2012 |
| CN | 102801851 A | 11/2012 |
| CN | 102857549 A | 1/2013 |
| EP | 2 081 385 A2 | 7/2009 |
| WO | 2013/016949 A1 | 2/2013 |

* cited by examiner

METHOD AND ELECTRONIC DEVICE FOR SENDING AND RECEIVING DATA

CROSS-REFERENCE TO RELATED APPLICATION(S)

This application claims the benefit under 35 U.S.C. §119 (a) of a Korean patent application filed on Feb. 20, 2013 in the Korean Intellectual Property Office and assigned Serial number 10-2013-0018134, and a Korean patent application filed on Mar. 4, 2013 in the Korean Intellectual Property Office and assigned Serial number 10-2013-0022940, the entire disclosure of each of which is hereby incorporated by reference.

TECHNICAL FIELD

The present disclosure relates to an electronic device. More particularly, the present disclosure relates to a method in an electronic device for sending and receiving data to and from another electronic device, and an electronic device thereof.

BACKGROUND

As electronic devices are increasingly used, electronic device providers competitively develop electronic devices for providing a variety of convenient functions and additional functions to appeal to more users. Recently, diverse applications with various functions have been released for the sake of the users' convenience and leisure time. According to the related art, the electronic device may include several or tens of applications therein.

As wireless communication technologies advance, various methods allowing the electronic device to send and receive data to and from another electronic device are serviced. For example, the electronic device can send data to the other electronic device at a close range using Near Field Communication (NFC) tagging. In detail, the electronic device can detect the other electronic device at a close range and send stored application thereof to the other electronic device using the NFC. For example, the electronic device can send current display application information to the other electronic device at a close range so as to execute the application in the other electronic device.

However, such methods according to the related art do not consider both of the electronic devices in the one-way communication, and accordingly the communication can disregard an intention of the electronic device or the other electronic device.

Thus, a need exists for a method for sending and receiving the data by taking into account the intention of both of the electronic device and the other electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus of an electronic device for sending and receiving data to and from other electronic device.

Another aspect of the present disclosure is to provide a method and an apparatus of an electronic device for exchanging in-band information and application information, which are required to connect to other electronic device, with the other electronic device using Out Of Band (OOB) communication.

Another aspect of the present disclosure is to provide a method and an apparatus of an electronic device for exchanging User Interface (UI) depth information indicating progress of running application, with other electronic device.

Another aspect of the present disclosure is to provide a method and an apparatus of an electronic device for displaying an application execution screen based on UI depth information of the electronic device and UI depth information received from other electronic device.

Another aspect of the present disclosure is to provide a method and an apparatus of an electronic device for connecting to other electronic device using in-band information exchanged with the other electronic device.

In accordance with an aspect of the present disclosure, a method of an electronic device for communicating with another electronic device is provided. The method includes detecting a communication event of the other electronic device, if detecting the communication event, sending application information of an application running on the electronic device, to the other electronic device, receiving application information of an application running on the other electronic device, from the other electronic device, determining an application execution screen by comparing the application information of the electronic device with the application information received from the other electronic device, and displaying the determined application execution screen.

In accordance with another aspect of the present disclosure, an apparatus for communicating with another electronic device is provided. The apparatus includes at least one processor, a touch-sensitive display, at least one wireless communication system, a memory, and at least one program stored in the memory and configured for execution by the at least one processor. The at least one program includes instructions for detecting a communication event with the other electronic device, for sending application information of an application running on the electronic device, to the other electronic device if detecting the communication event, for receiving application information of an application running on the other electronic device, from the other electronic device, for determining an application execution screen by comparing the application information of the electronic device with the application information received from the other electronic device, and for displaying the determined application execution screen.

In accordance with another aspect of the present disclosure, a method in an electronic device for communicating with another electronic device is provided. The method includes sending information of an application running on the electronic device, receiving information of an application running on the other electronic device, determining an application execution screen based at least in part on the application information of the electronic device and the application information of the other electronic device, and displaying the determined application execution screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1A:
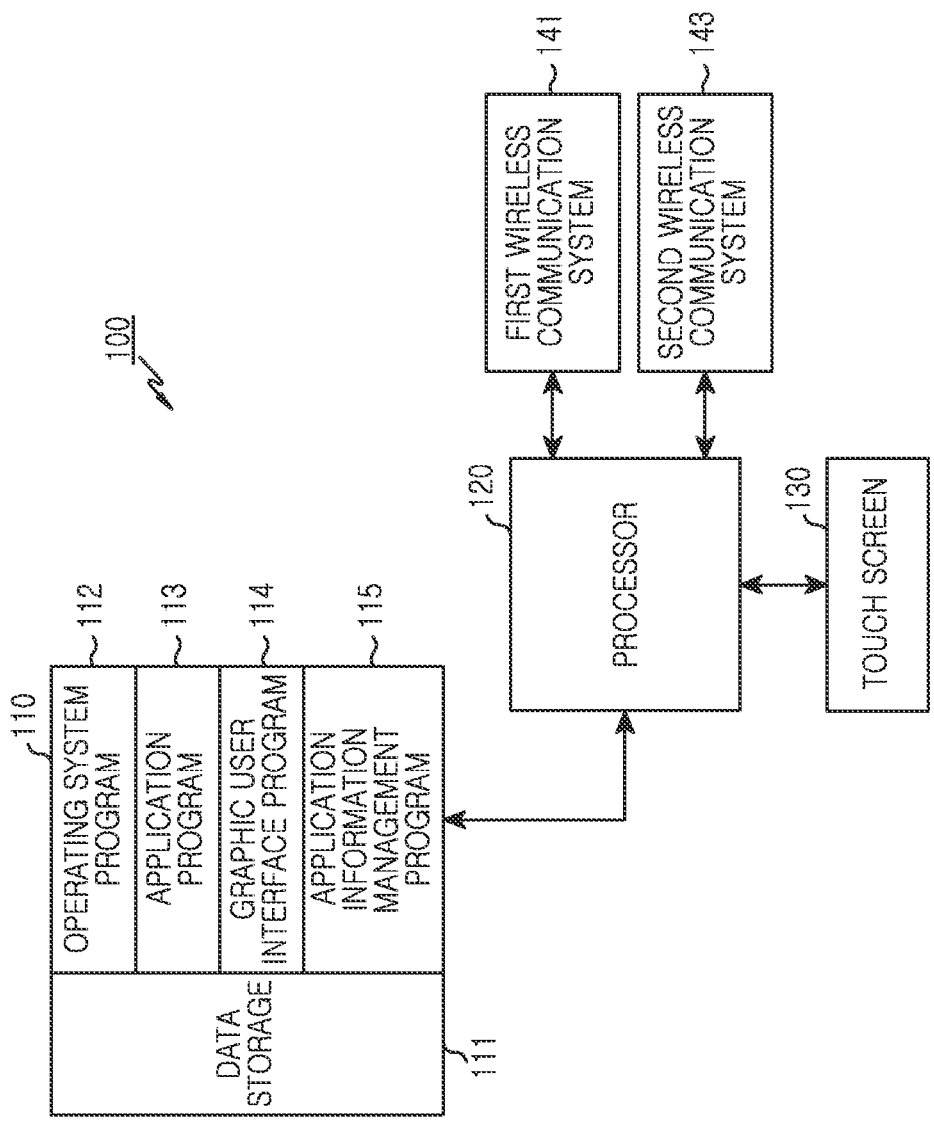
FIG. 1A illustrates an electronic device for sending and receiving data according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a mobile communication terminal, a smart phone, a video phone, an e-book reader, a desktop PC, a tablet Personal Computer (PC), a digital camera, an MP3 player, a navigation system, a laptop, a netbook, and a computer, for supporting wireless communication, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1A is a block diagram of an electronic device for sending and receiving data according to an embodiment of the present disclosure.

Referring to FIG. 1A, the electronic device 100 includes a memory 110, a processor 120, a touch screen 130, a first wireless communication system 141, and a second wireless communication system 143. According to various embodiments of the present disclosure, the electronic device 100 may include a plurality of memories 110, a plurality of processors 120, and/or the like.

The memory 110 includes a data storage 111, an operating system program 112, an application program 113, a graphic user interface program 114, and an application information management program 115. The program may be a software component and may be represented as a set of instructions. Accordingly, the program can be referred to as an instruction set. In addition, the program may be referred to as a module.

The memory 110 can store one or more programs including instructions according to an embodiment of the present disclosure.

The data storage 111 stores data generating in the function execution corresponding to the program stored in the memory 110. The data storage 111 can store running application information and in-band information. The application information includes an IDentifier (ID) or a name of the running application, and User Interface (UI) depth information of the application. The application UI depth information indicates progress of the application. A UI depth value can increase every time an application execution screen is changed according to user control. For example, if the electronic device executes an application and displays an application intro screen, the UI depth information is 1. Next, if the application display screen is updated according to a user's menu selection, the UI depth information can increase to 2. The in-band information indicates information required to connect the communication between the electronic device 100 and other electronic device, and includes necessary information for the connection using a communication scheme (e.g., Wireless Fidelity (Wi-Fi), Bluetooth, and/or the like) supported by the electronic device through the in-band communication.

If the application is executed, the data storage 111 can store minimum required UI depth information for performing a function supported by the corresponding application. For example, if a next screen of the intro screen (e.g., UI depth information=1) is required to perform the function of a first application, the data storage 111 can store the minimum required UI depth information 2 of the first application.

According to various embodiments of the present disclosure, if current application information displayed is compared with application information received from another electronic device and the electronic device 100 and the other electronic device are not running the application, the data storage 111 can store an application recommendation list for the screen display. According to various embodiments of the present disclosure, the application recommendation list includes at least one application concurrently usable by the electronic device 100 and the other electronic device. The application recommendation list can be prestored in design phase, or updated and stored by the user. The application recommendation list may be configurable according to user preferences, settings, and/or the like. According to various embodiments of the present disclosure, the application recommendation list can be acquired by exchanging information between the electronic devices. According to various embodiments of the present disclosure, the application recommendation list may be generated according to information exchanged between the electronic devices.

The data storage 111 can store an ID of a group of electronic devices which respectively send and receive data using Near Field Communication (NFC) tagging. For example, the data storage 111 can store an ID of a first group including the electronic device 100, a first electronic device, and a second electronic device. If the application UI depth information and a screen corresponding to the UI depth information are displayed, the data storage 111 can map and store a function linked to or required by the displayed screen. For example, to display the screen corresponding to the UI depth information 2 of the first application, if the Wi-Fi connection is required, the data storage 111 can map and store the UI depth information 2 of the first application and the Wi-Fi function.

The operating system program 112 (e.g., the embedded operating system such as WINDOWS, LINUX, Darwin, RTXC, UNIX, OS X, VxWorks, and/or the like) includes various software components for controlling general system operations. As an example, the various software components for controlling the general system operations include memory management and control, storage hardware (device) control and management, and power control and management. The operating system program 112 processes normal communication between various hardware (devices) and software components (programs).

The application program 113 includes applications for a browser functionality, an e-mail functionality, a message (e.g., Short Message Service (SMS), Multimedia Messaging Service (MMS), instant messaging, and/or the like), functionality, a word processing functionality, an address book functionality, a widget functionality, Digital Right Management (DRM) functionality, voice recognition functionality, voice reproduction functionality, a position determining functionality, a location based service functionality, a phone functionality, schedule management functionality, task management functionality, and/or the like.

The graphic user interface program 114 includes at least one software component for providing a UI using graphics between the user and the electronic device 100. For example, the graphic user interface program 114 includes at least one software component for displaying UI information on the touch screen 130. The graphic user interface program 114 includes an instruction for displaying the application execution screen based on the application UI depth information currently displayed and the UI depth information received from the other electronic device. For example, according to the comparison of the application UI depth information currently displayed and the UI depth information received from the other electronic device, the graphic user interface program 114 can change the currently displayed application execution screen with an application execution screen corresponding to the UI depth information received from the other electronic device.

The graphic user interface program 114 includes an instruction for displaying graphics indicating the communication with the other electronic device. For example, the graphic user interface program 114 can display a popup message indicating the data exchange with the other electronic device using the NFC tagging.

If the electronic device 100 and the other electronic device are running different applications, the graphic user interface program 114 includes an instruction for providing an option for asking the user which application is executed in the electronic device 100 and the other electronic device. For example, the graphic user interface program 114 may prompt the user to provide an indication (e.g., selection or the like) of the application being executed on the electronic device 100 and/or the other electronic device. The selection option can be displayed as a popup message. According to various embodiments of the present disclosure, if the electronic device 100 and the other electronic device are not running any application, the graphic user interface program 114 includes an instruction for displaying the application recommendation list for the electronic device 100 and the other electronic device. For example, if the electronic device 100 and the other electronic device are not running any application, the graphic user interface program 114 can display the application recommendation list including a first application and a second application for the electronic device 100 and the other electronic device.

The application information management program 115 can obtain application information stored in the memory, and send the application information to the other electronic device if a communication event is detected. The application information includes at least one of the ID or the name of the running application, and the UI depth information of the application. The application information management program 115 can send the application information to the other electronic device using Out Of Band (OOB) communication. If the electronic device 100 is not connected to the other electronic device using the in-band communication, the application information management program 115 can send the in-band information required for the in-band connection with the other electronic device, in addition to the application information. In contrast, if the electronic device 100 is already connected to the other electronic device using the in-band communication, the application information management program 115 can send the application information to the other electronic device using the OOB communication. For example, if the electronic device 100 is already connected to the other electronic device using the in-band communication, the application information management program 115 may send the application information to the other electronic device using the OOB communication without also sending in-band information. As another example, if the electronic device 100 is already connected to the other electronic device using the in-band communication, the application information management program 115 may send only the application information to the other electronic device using the OOB communication.

According to various embodiments of the present disclosure, if detecting the communication event, the application information management program 115 can receive the application information from the other electronic device. The other electronic device indicates an electronic device connected through the wireless communication to send and receive data. The application information management program 115 can receive the application information from the other electronic device using the OOB communication. If the electronic device 100 is not connected to the other electronic device using the in-band communication, the application information management program 115 can receive the in-band information required for the in-band connection with the other electronic device, in addition to the application information. In contrast, if the electronic device 100 is already connected to the other electronic device using the in-band communication, the application information management program 115 can receive the application information from the other electronic device using the OOB communication. For example, if the electronic device 100 is already connected to the other electronic device using the in-band communication, the application information management program 115 may receive the application information from the other electronic device using the OOB communication without also receiving in-band information. As another example, if the electronic device 100 is already connected to the other electronic device using the in-band communication, the application information management program 115 may receive only the application information from the other electronic device using the OOB communication.

According to various embodiments of the present disclosure, if detecting the communication event, the application information management program 115 can send a message including information about main application and $3^{rd}$ party application running on the electronic device 100, to the other electronic device. The $3^{rd}$ party application may be a sub-application which can be concurrently run with the main application, and is subordinate to the main application.

According to various embodiments of the present disclosure, if detecting the communication event, the application information management program 115 can receive a message including main application and $3^{rd}$ party application information from the other electronic device. For example, if receiving a message in the form of main application name: $3^{rd}$ party application name: screen information through a band service, the application information management program 115 can identify the main application name, execute the identified main application, identify the $3^{rd}$ party application name, and execute the identified $3^{rd}$ party application. The screen information can include at least one of main application UI depth information and $3^{rd}$ party application UI depth information. Hence, the application information management program 115 can display the main application screen and the $3^{rd}$ party application screen according to the UI depth information of the screen information.

According to various embodiments of the present disclosure, if the communication is connected to a particular electronic device and the communication event with other electronic device is detected, the application information management program 115 can compare the group ID of the electronic device 100 with the group ID of the other electronic device and thus determine whether to send the application information. For example, the electronic device 100 may communicate with the first electronic device to create a first group, the other electronic device may communicate with the second electronic device to create a second group, and the electronic device 100 and the other electronic device may detect each other. In this case, the application information management program 115 exchanges and compares the ID of the first group including the electronic device 100 and the ID of the second group including the other electronic device.

According to various embodiments of the present disclosure, if the application information management program 115 confirms different group IDs (e.g., if the application information management program 115 determines that the ID of the first group including the electronic device 100 is different from the ID of the second group including the other electronic device), the application information management program 115 determines whether the electronic device 100 and the other electronic device run different applications by comparing the application information of the electronic device 100 and the other electronic device.

According to various embodiments of the present disclosure, if the application information management program 115 determines that the electronic device 100 and the other electronic device run different applications, the application information management program 115 can determine that the first group and the second group run different applications, and provide the selection option for asking the user which one of the applications of the electronic device 100 and the other electronic device is executed. For example, the application information management program 115 may prompt the user to provide an indication of the applications being executed by the electronic device 100 and/or the other electronic device.

Next, the electronic device 100 and the other electronic device can run the same application according to the selected option. For example, if confirming no group ID of the other electronic device or no group corresponding to the group ID of the other electronic device, the application information management program 115 can send the running application information to the other electronic device. The application information management program 115 can compare the current application information with the application information received from the other electronic device and thus determine whether the electronic device 100 and the other electronic device run the same application or different applications, or whether only the electronic device 100 runs the application and the other electronic device does not run the application.

According to various embodiments of the present disclosure, if the application information management program 115 determines that the electronic device 100 and the other electronic device run the same application, the application information management program 115 can display the application execution screen based on the UI depth information of the electronic device 100 and the other electronic device. More specifically, if the electronic device 100 and the other electronic device run the same application, the application information management program 115 can determine that the likelihood that the application is to be used as the UI depth information of the current application is relatively high, and thus display the application execution screen of the electronic device 100 and the other electronic device with the application execution screen of the high UI depth information. For example, if the UI depth information of the current application is 1 and the application UI depth information received from the other electronic device is 3, the application information management program 115 can change the current display screen with the execution screen corresponding to the UI depth information 3. For example, if the UI depth information of the current application is 4 and the application UI depth information received from the other electronic device is 1, the application information management program 115 can display the current display screen.

According to various embodiments of the present disclosure, if the application information management program 115 compares the current application information and the application information received from the other electronic device and determines that the electronic device and the other electronic device are running different applications, the application information management program 115 can display a message for asking the user to select one of the two different applications and select the application to execute under the user control. According to various embodiments of the present disclosure, the application information management program 115 may select the application based on a predefined priority without displaying the selection message. For example, the application information management program 115 can select the application to run by considering at least one of a predefined rule, a predefined priority, an inclusion relation of the applications, and application characteristics.

Next, the application information management program 115 can run the selected application and display the execution screen according to the UI depth information of the selected application.

According to various embodiments of the present disclosure, if the application information management program 115 compares the current application information and the application information received from the other electronic device and determines that only one of the electronic device 100 and the other electronic device runs the application (e.g., a specific application) and the other does not run the application, the application information management program 115 can display the execution screen based on the UI depth information of the running application. For example, if the first electronic device runs the first application and the second electronic device does not run the first application, the application information management program 115 can automatically execute the first application in the second electronic device and display the execution screen of the first application of the second electronic device according to the UI depth information of the first application run by the first electronic device.

According to various embodiments of the present disclosure, if the application information management program 115 compares the current application information and the application information received from the other electronic device and determines that neither the electronic device 100 nor the other electronic device run the application (e.g., a specific application), the application information management program 115 can provide the application recommendation list for the concurrent execution in the electronic device 100 and the other electronic device.

Next, if the electronic device 100 and the other electronic device select the application on the application recommendation list, the application information management program 115 can execute the selected application. If the electronic device 100 and the other electronic device each select a particular application, the application information management program 115 can execute the applications based on the priority of the electronic device or under the user control.

The application information management program 115 can identify the application running at the top level and determine whether the application is currently running. For example, if checking (e.g., determining) the name of the application running at the top level and confirming "Launcher" in the application name, the application information management program 115 can determine that the electronic device 100 is in an idle mode in which the application is not running. For example, if checking (e.g., determining) Manifest of the application running at the top level and detecting "Launcher" attribute in the Manifest, the application information management program 115 can determine that the electronic device 100 is in the idle mode in which the application is not running. Although the application information management program 115 determines the idle mode based on, but not limited to, the Android platform, the application information management program 115 may determine the idle mode based on other platforms installed to the electronic device 100. For example, if the application information management program 115 checks (e.g., determines) the name of the application running at the top level on Windows platform and the application name includes "background", the application information management program 115 can determine that the electronic device 100 is in the idle mode in which the application is not running. According to various embodiments of the present disclosure, the application information management program 115 may determine whether the electronic device 100 is operating in an idle mode. For example, the application information management program 115 may determine whether the electronic device 100 is operating in an idle mode based on an application running at the top level. The application information management program 115 may determine whether the electronic device 100 is operating in an idle mode for various operating environments (e.g., Android, Windows, and/or the like).

The application information management program 115 can display the corresponding application execution screen according to whether the highest UI depth information of the UI depth information of the electronic device 100 and the other electronic device is higher than the minimum required UI depth information. If the highest UI depth information of the UI depth information of the electronic device 100 and the other electronic device is higher than the minimum required UI depth information, the application information management program 115 can display the corresponding application execution screen according to the highest UI depth information of the UI depth information of the electronic device 100 and the other electronic device. For example, if the highest UI depth information of the UI depth information of the electronic device 100 and the other electronic device is 4 and the minimum required UI depth information is 3, the application information management program 115 can display the corresponding application execution screen with the execution screen corresponding to the UI depth information 4. In contrast, if the highest UI depth information of the UI depth information of the electronic device 100 and the other electronic device is lower than the minimum required UI depth information, the application information management program 115 can display the corresponding application execution screen according to the minimum required UI depth information. For example, if the highest UI depth information of the UI depth information of the electronic device 100 and the other electronic device is 1 and the minimum required UI depth information is 2, the application information management program 115 can display the corresponding application execution screen with the execution screen corresponding to the UI depth information 2.

According to various embodiments of the present disclosure, if a particular function is required for the corresponding execution screen during the execution screen display corresponding to the UI depth information, the application information management program 115 can provide a function mapped to the corresponding UI depth information. For example, if login is required for the corresponding application to display the execution screen corresponding to the UI depth information, the application information management program 115 may display a login screen, may perform the login according to login information input from the user, and may then display the execution screen corresponding to the UI depth information. According to various embodiments of the present disclosure, the application information management program 115 can provide an auto login option. If the user logs in with the auto login option selected, the application information management program 115 can display the execution screen corresponding to the UI depth information without any login process.

The processor 120 can include at least one processor and a peripheral interface, which are not shown. The processor 120 executes a particular program (instruction set) stored in the memory 110 and performs a plurality of functions corresponding to the program.

The touch screen 130 is a touch-sensitive display and provides an interface for the touch input/output between the electronic device 100 and the user. The touch screen 130 is a medium for detecting the touch (or the contact) through a touch sensor (not shown), for sending the detected touch input to the electronic device 100, and for providing a visual output of the electronic device 100 to the user. For example, in response to the touch input, the touch screen 130 provides the visual output to the user based on text, graphics, and video.

The touch screen 130 includes the touch-sensitive surface for detecting the user's touch input, and senses (e.g., detects) the user touch input using haptic contact, tactile contact, and/or the like, or a combination thereof. For example, the detected touch point of the touch screen 130 corresponds to a digit of a finger used to contact the touch-sensitive surface. On the touch-sensitive surface, the touch screen 130 detects the contact of an external device such as stylus pen. The detected contact is converted to an interaction corresponding to the UI (e.g., a soft key) displayed on the touch screen 130.

The touch screen 130 can adopt various display technologies such as Liquid Crystal Display (LCD), Light Emitting Diode (LED), Light emitting Polymer Display (LPD), Organic LED (OLED), Active Matrix OLED (AMOLED), Flexible LED (FLED), and/or the like. The touch screen 130 is not limited to a touch screen using the aforementioned display technologies. The touch screen 130 can detect the contact start, the contact movement, or the contact stop (e.g., an end or lifting of a touch event) or end on the touch-sensitive surface using, but not limited to, various touch detection (sensing) techniques such as capacitive detection, resistive detection, infrared detection, surface sound wave detection, and/or the like. The touch screen 130 can display the application execution screen according to the UI depth information of the application currently displayed and the UI depth information received from the other electronic device. The touch screen 130 can display the message requesting to select one of the application running on the electronic device 100 and the application running on the other electronic device.

The first wireless communication system 141 and the second wireless communication system 143 can respectively include a radio frequency transmitter and receiver, an optical (e.g., infrared light) transmitter and receiver, and/or the like. The first wireless communication system 141 and the second wireless communication system 143 can be divided based on the communication network supported by the electronic device 100. For example, the electronic device 100 can include the wireless communication system supporting any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, a Bluetooth network, and/or the like, or any other suitable type of network. The wireless communication system is not limited to the wireless communication system supporting the aforementioned networks, and may support other networks. According to various embodiments of the present disclosure, at least one of the first wireless communication system 141 and the second wireless communication system 143 can support wireless LAN. For example, either the first wireless communication system 141 or the second wireless communication system 143 can operate over a Wi-Fi network. The first wireless communication system 141 and the second wireless communication system 143 may be constructed as a single wireless communication system. The first wireless communication system 141 can perform the wireless communication based on the OOB, and the second wireless communication system 143 can perform the wireless communication based on the in-band. Depending on the respective designs of the first wireless communication system 141 and the second wireless communication system 143, the first wireless communication system 141 can perform the wireless communication based on the in-band, and the second wireless communication system 143 can perform the wireless communication based on the OOB.

Figure 1B:
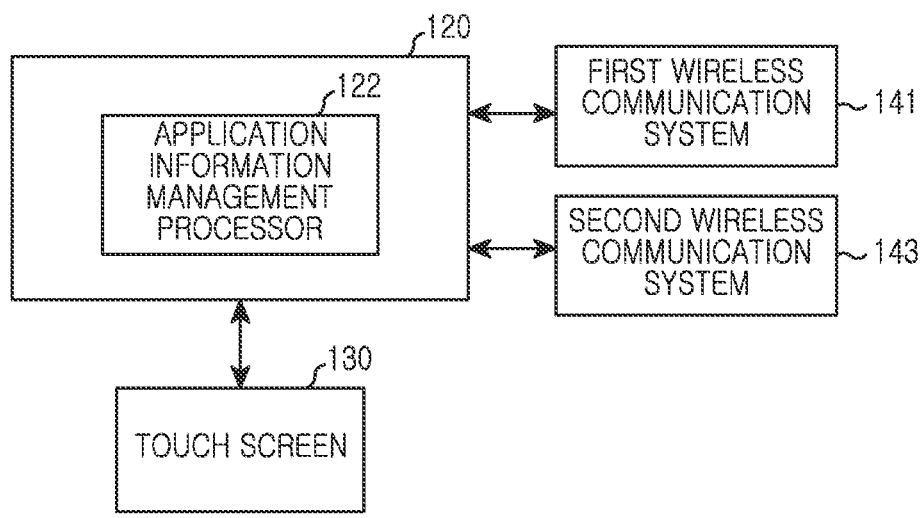
FIG. 1B illustrates a processor for sending and receiving data according to an embodiment of the present disclosure.

FIG. 1B is a block diagram of the processor for sending and receiving data according to an embodiment of the present disclosure.

Referring to FIG. 1B, the processor 120 of the electronic device 100 includes an application information management processor 122.

According to various embodiments of the present disclosure, the application information management processor 122 can obtain the application information stored in the memory, and send the application information to the other electronic device if the communication event is detected. The application information includes at least one of the ID or the name of the running application, and the UI depth information. The application information management processor 122 can send the application information to the other electronic device through the OOB communication. According to various embodiments of the present disclosure, if the electronic device 100 is not connected to the other electronic device through the in-band connection, the application information management processor 122 can send the in-band information required for the in-band connection with the other electronic device, in addition to the application information. In contrast, according to various embodiments of the present disclosure, if the electronic device 100 is already connected to the other electronic device using the in-band connection, the application information management processor 122 can send the application information to the other electronic device using the OOB communication. For example, if the electronic device 100 is already connected to the other electronic device using the in-band connection, the application information management processor 122 may send the application information to the other electronic device using the OOB communication without also sending the in-band information. As another example, if the electronic device 100 is already connected to the other electronic device using the in-band connection, the application information management processor 122 may only send the application information to the other electronic device using the OOB communication.

If detecting the communication event, the application information management processor 122 can receive the application information from the other electronic device. The other electronic device indicates the electronic device connected through the wireless communication to send and receive data. The application information management processor 122 can receive the application information from the other electronic device using the OOB communication. According to various embodiments of the present disclosure, if the electronic device 100 is not connected to the other electronic device using the in-band connection, the application information management processor 122 can receive the in-band information required for the in-band connection with the other electronic device, in addition to the application information. In contrast, according to various embodiments of the present disclosure, if the electronic device 100 is already connected to the other electronic device using the in-band connection, the application information management processor 122 can receive the application information from the other electronic device using the OOB communication. For example, if the electronic device 100 is already connected to the other electronic device using the in-band connection, the application information management processor 122 may receive the application information from the other electronic device using the OOB communication without also receiving the in-band information. As another example, if the electronic device 100 is already connected to the other electronic device using the in-band connection, the application information management processor 122 may receive only the application information from the other electronic device using the OOB communication.

If detecting the communication event, the application information management processor 122 can send the message including the main application and $3^{rd}$ party application information of the electronic device 100, to the other electronic device. The $3^{rd}$ party application may be the sub-application which can be concurrently run with the main application, and is subordinate to the main application.

According to various embodiments of the present disclosure, if detecting the communication event, the application information management processor 122 can receive the message including the main application and $3^{rd}$ party application information from the other electronic device. For example, if receiving the message in the form of main application name: $3^{rd}$ party application name: screen information through the band service, the application information management processor 122 can identify the main application name, execute the identified main application, identify the $3^{rd}$ party application name, and execute the identified $3^{rd}$ party application. The screen information can include at least one of the main application UI depth information and the $3^{rd}$ party application UI depth information. Hence, the application information management processor 122 can display the main application screen and the $3^{rd}$ party application screen according to the UI depth information of the screen information.

According to various embodiments of the present disclosure, if the communication is connected to a particular electronic device and the communication event with other electronic device is detected, the application information management processor 122 can compare the group ID of the electronic device 100 with the group ID of the other electronic device and thus determine whether to send the application. For example, the electronic device 100 may communicate with the first electronic device to create the first group, the other electronic device may communicate with the second electronic device to create the second group, and the electronic device 100 and the other electronic device may detect each other. In this case, the application information management processor 122 exchanges and compares the ID of the first group including the electronic device 100 and the ID of the second group including the other electronic device.

According to various embodiments of the present disclosure, if the application information management processor 122 confirms different group IDs (e.g., if the application information management processor 122 determines that the ID of the first group including the electronic device 100 is different from the ID of the second group including the other electronic device), the application information management processor 122 determines whether the electronic device 100 and the other electronic device run different applications by comparing the application information of the electronic device 100 and the other electronic device.

According to various embodiments of the present disclosure, if the application information management processor 122 determines that the electronic device 100 and the other electronic device run different applications, the application information management processor 122 can determine that the first group and the second group run different applications, and provide the selection option for asking the user which one of the different applications of the first group and the second group is to run. For example, the application information management processor 122 may prompt the user to provide an indication of the applications being run by the electronic device 100 and/or the other electronic device.

Next, the electronic device 100 and the other electronic device can run the same application according to the selected option. For example, if confirming no group ID of the other electronic device or no group corresponding to the group ID of the other electronic device, the application information management processor 122 can send the current application information to the other electronic device. The first application information management processor 122 can compare the current application information with the application information received from the other electronic device and thus determine whether the electronic device 100 and the other electronic device run the same application or different applications, or whether only the electronic device 100 runs the application and the other electronic device does not run the application.

According to various embodiments of the present disclosure, if the application information management processor 122 determines that the electronic device 100 and the other electronic device run the same application, the application information management processor 122 can display the application execution screen based on the UI depth information of the electronic device 100 and the other electronic device. More specifically, if the electronic device 100 and the other electronic device run the same application, the application information management processor 122 can determine that the likelihood that the application is to be used as the UI depth information of the running application is relatively high, and thus display the application execution screen of the electronic device 100 and the other electronic device with the application execution screen of the high UI depth information. For example, if the UI depth information of the current application is 1 and the application UI depth information received from the other electronic device is 3, the application information management processor 122 can change the current display screen with the execution screen corresponding to the UI depth information 3. For example, if the UI depth information of the current application is 4 and the application UI depth information received from the other electronic device is 1, the application information management processor 122 can display the current display screen.

According to various embodiments of the present disclosure, if the application information management processor 122 compares the current application information with the application information received from the other electronic device and determines that the electronic device 100 and the other electronic device are running different applications, the application information management processor 122 can display the message for asking the user to select one of the two different applications and select the application to execute under the user control. According to various embodiments of the present disclosure, the application information management processor 122 may select the application based on a predefined priority without displaying the selection message. For example, the application information management processor 122 may select the application to run by considering at least one of a predefined rule, a predefined priority, an inclusion relation of the applications, and application characteristics.

Next, the application information management processor 122 can run the selected application and display the execution screen according to the UI depth information of the selected application.

According to various embodiments of the present disclosure, if the application information management processor 122 compares the current application information and the application information received from the other electronic device and determines that only one of the electronic device 100 and the other electronic device runs the application (e.g., a specific application) and the other does not run the application, the application information management processor 122 can display the execution screen according to the UI depth information of the running application. For example, if the first electronic device runs the first application and the second electronic device does not run the first application, the application information management processor 122 can automatically execute the first application in the second electronic device and display the execution screen of the first application of the second electronic device according to the UI depth information of the first application run by the first electronic device.

According to various embodiments of the present disclosure, if the application information management processor 122 compares the current application information and the application information received from the other electronic device and determines that neither the electronic device 100 nor the other electronic device run the application (e.g., a specific application), the application information management processor 122 can provide the application recommendation list for the concurrent execution in the electronic device 100 and the other electronic device.

Next, if the electronic device 100 and the other electronic device select the application on the application recommendation list, the application information management processor 122 can execute the selected application. If the electronic device 100 and the other electronic device each select a particular application, the application information management processor 122 can execute the application based on the priority of the electronic devices or under the user control.

The application information management processor 122 can identify the application running at the top level and determine whether the application is running currently. For example, if checking (e.g., determining) the name of the application running at the top level and detecting "Launcher" in the application name, the application information management processor 122 can determine that the electronic device 100 is in the idle mode in which the application is not running. For example, if checking (e.g., determining) Manifest of the application running at the top level and detecting "Launcher" attribute in the Manifest, the application information management processor 122 can determine the idle mode in which the application is not currently running. Although the application information management processor 122 determines that the electronic device 100 is in the idle mode based on, but not limited to, the Android platform, the application information management processor 122 may determine the idle mode based on other platforms installed to the electronic device 100. For example, if the application information management processor 122 checks (e.g., determines) the name of the application running at the top level on Windows platform and the application name includes "background", the application information management processor 122 can determine that the electronic device 100 is in the idle mode in which the application is not currently running. According to various embodiments of the present disclosure, the application information management processor 122 may determine whether the electronic device 100 is operating in an idle mode. For example, the application information management processor 122 may determine whether the electronic device 100 is operating in an idle mode based on an application running at the top level. The application information management processor 122 may determine whether the electronic device 100 is operating in an idle mode for various operating environments (e.g., Android, Windows, and/or the like).

The application information management processor 122 can display the corresponding application execution screen according to whether the highest UI depth information of the UI depth information of the electronic device 100 and the other electronic device is higher than the minimum required UI depth information. If the highest UI depth information of the UI depth information of the electronic device 100 and the other electronic device is higher than the minimum required UI depth information, the application information management processor 122 can display the corresponding application execution screen according to the highest UI depth information of the UI depth information of the electronic device 100 and the other electronic device. For example, if the highest UI depth information of the UI depth information of the electronic device 100 and the other electronic device is 4 and the minimum required UI depth information is 3, the application information management processor 122 can display the corresponding application execution screen with the execution screen corresponding to the UI depth information 4. In contrast, if the highest UI depth information of the UI depth information of the electronic device 100 and the other electronic device is lower than the minimum required UI depth information, the application information management processor 122 can display the corresponding application execution screen according to the minimum required UI depth information. For example, if the highest UI depth information of the UI depth information of the electronic device 100 and the other electronic device is 1 and the minimum required UI depth information is 2, the application information management processor 122 can display the corresponding application execution screen with the execution screen corresponding to the UI depth information 2.

According to various embodiments of the present disclosure, if the application information management processor 122 compares the current application information and the application information received from the other electronic device and determines that the electronic device 100 and the other electronic device are running different applications, the application information management processor 122 can display the message for asking the user to select one of the two different applications and select the application to execute under the user control. According to various embodiments of the present disclosure, the application information management processor 122 may select the application based on the predefined priority without displaying the selection message. For example, the application information management processor 122 may select the application to execute by considering the predefined rule, the predefined priority, the inclusion relation of the applications, and the application characteristics.

Next, the application information management processor 122 can run the selected application and display the execution screen according to the UI depth information of the selected application.

According to various embodiments of the present disclosure, if the application information management processor 122 compares the current application information and the application information received from the other electronic device and determines that only one of the electronic device 100 and the other electronic device runs the application (e.g., a specific application) and the other does not run the application, the application information management processor 122 can display the execution screen according to the UI depth information of the running application.

According to various embodiments of the present disclosure, if a particular function is required for the corresponding execution screen during the execution screen display corresponding to the UI depth information, the application information management processor 122 can provide a function mapped to the corresponding UI depth information. For example, if the login is required for the corresponding application to display the execution screen corresponding to the UI depth information, the application information management processor 122 may display the login screen, may perform the login according to login information input from the user, and may then display the execution screen corresponding to the UI depth information. According to various embodiments of the present disclosure, the application information management processor 122 can provide the auto login option. If the user logs in with the auto login option selected, the application information management processor 122 can display the execution screen corresponding to the UI depth information without any login process.

Figure 2A:
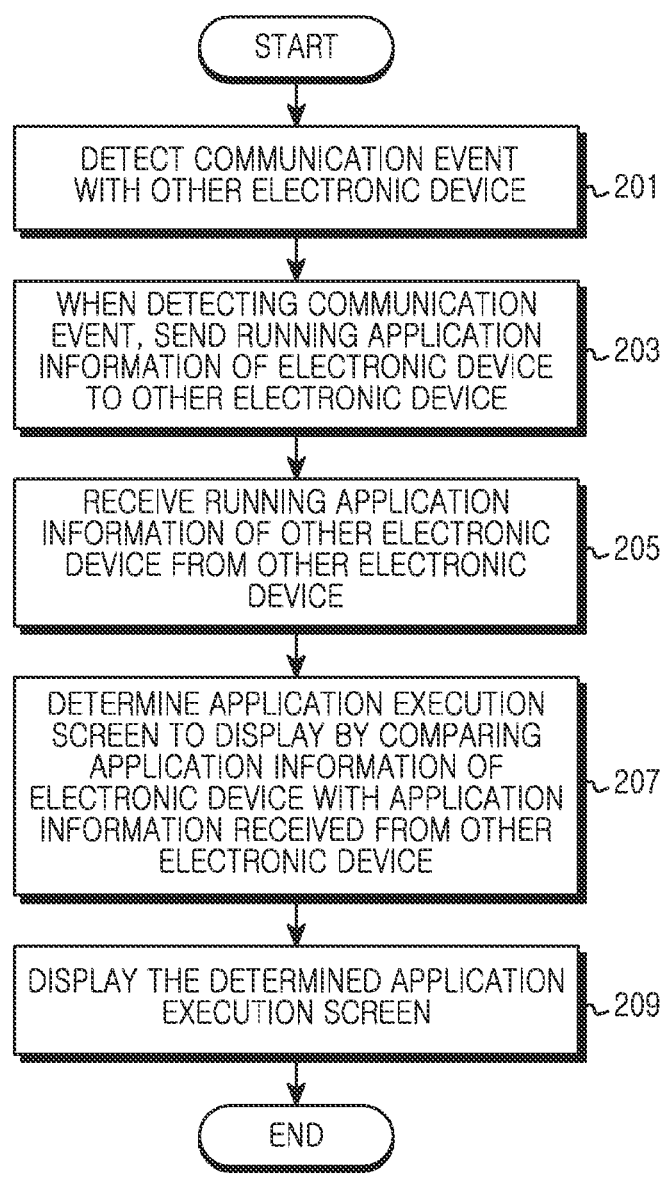
FIG. 2A illustrates a method of an electronic device for displaying an application execution screen based on application information of the electronic device and another electronic device according to an embodiment of the present disclosure.

FIG. 2A illustrates a method of an electronic device for displaying the application execution screen based on the application information of the electronic device and another electronic device according to an embodiment of the present disclosure.

Referring to FIG. 2A, at operation 201, the electronic device 100 detects the communication event with the other electronic device. For example, the electronic device 100 can detect the communication event by detecting the other electronic device within a threshold distance from the electronic device 100 using the NFC.

Upon detecting the communication event at operation 201, at operation 203, the electronic device 100 sends running application information thereof to the other electronic device. For example, the electronic device 100 identifies the application which is executed and displayed, obtains the identified application information, and then sends the obtained application information to the other electronic device. The application information includes the running application information and the application UI depth information. In addition, the electronic device 100 can send the in-band information required for the communication connection with the other electronic device.

At operation 205, the electronic device 100 receives the running application information of the other electronic device from the other electronic device. For example, the electronic device 100 can receive the running application information of the other electronic device, and the received application information includes the running application of the other electronic device and the application UI depth information. In addition, the electronic device 100 can receive the in-band information required for the communication connection with the other electronic device.

At operation 207, the electronic device 100 determines the application execution screen to display by comparing application information thereof with the application information received from the other electronic device. If the electronic device 100 determines that the electronic device 100 and the other electronic device run different applications, the electronic device 100 can determine the application to execute based on the prestored application priority, and then determine the application execution screen to display according to the determined application UI depth information. In contrast, if the electronic device 100 determines that the electronic device 100 and the other electronic device run the same application, the electronic device 100 can compare the UI depth information of application information of the electronic device 100 and the application information received from the other electronic device, and thus determine the application execution screen corresponding to the higher UI depth information among the application execution screens of the electronic device 100 and the other electronic device, as the application execution screen to display.

At operation 209, the electronic device 100 displays the determined application execution screen. Thus, the electronic device 100 can match the application execution screen thereof with the application execution screen of the other electronic device.

Figure 2B:
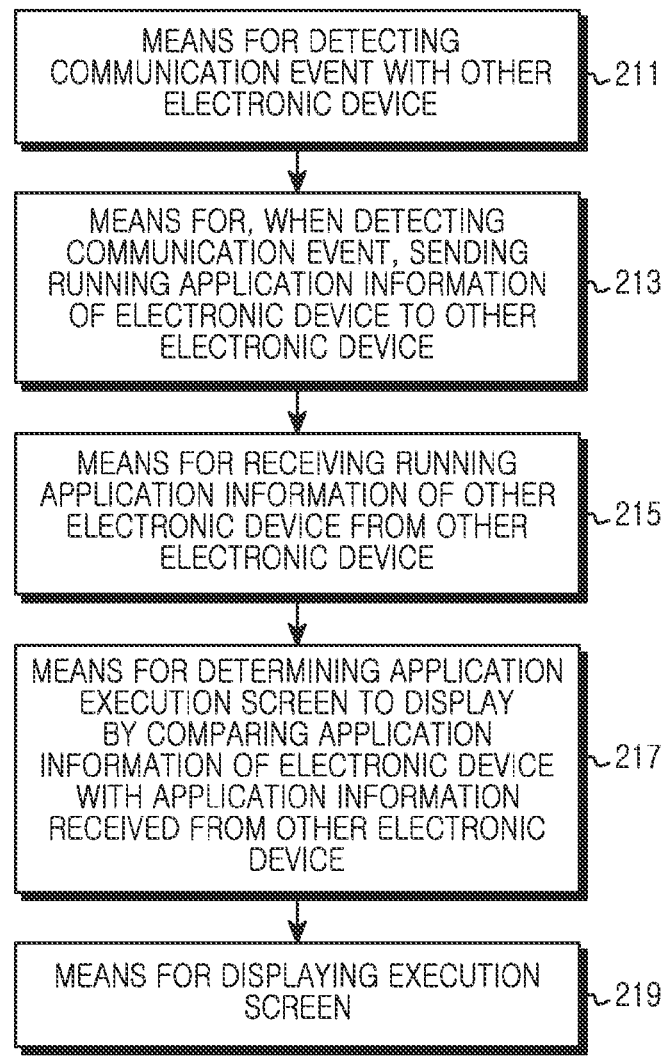
FIG. 2B illustrates a method of an electronic device for displaying an application execution screen based on application information of the electronic device and another electronic device according to an embodiment of the present disclosure.

FIG. 2B illustrates a method of an electronic device for displaying an application execution screen based on application information of the electronic device and another electronic device according to an embodiment of the present disclosure.

Referring to FIG. 2B, the electronic device 100 includes a means 211 for detecting the communication event with the other electronic device. The electronic device 100 supports at least one wireless communication. For example, the electronic device 100 can communicate with the other electronic device using the NFC tagging.

The electronic device 100 includes a means 213 for sending running application information of the electronic device 100 to the other electronic device if the communication event is detected, and a means 215 for receiving the running application information of the other electronic device from the other electronic device. According to various embodiments of the present disclosure, the electronic device 100 includes a means for acquiring the UI depth information of the running application.

The electronic device 100 includes a means 217 for determining the application execution screen to display by comparing application information of the electronic device 100 with the application information received from the other electronic device. According to various embodiments of the present disclosure, the electronic device 100 can include a means for confirming the UI depth information from the application information of the electronic device 100 and the other electronic device, and a means for comparing the UI depth information of the electronic device 100 and the UI depth information from the other electronic device.

The electronic device 100 includes a means 219 for displaying the determined application execution screen.

Figure 3:
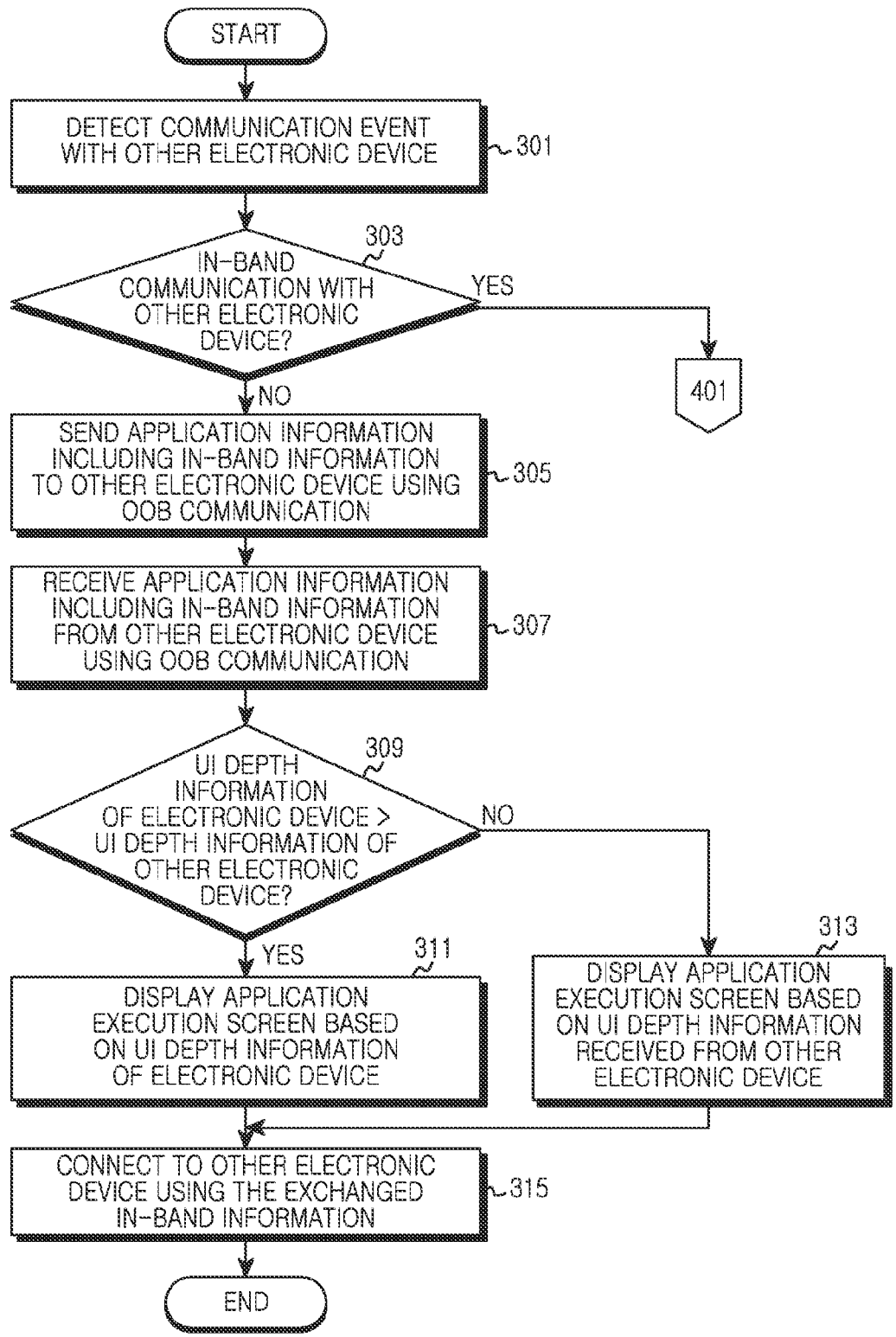
FIG. 3 illustrates a method of an electronic device for displaying a same application execution screen as another electronic device according to an embodiment of the present disclosure.
Figure 5:
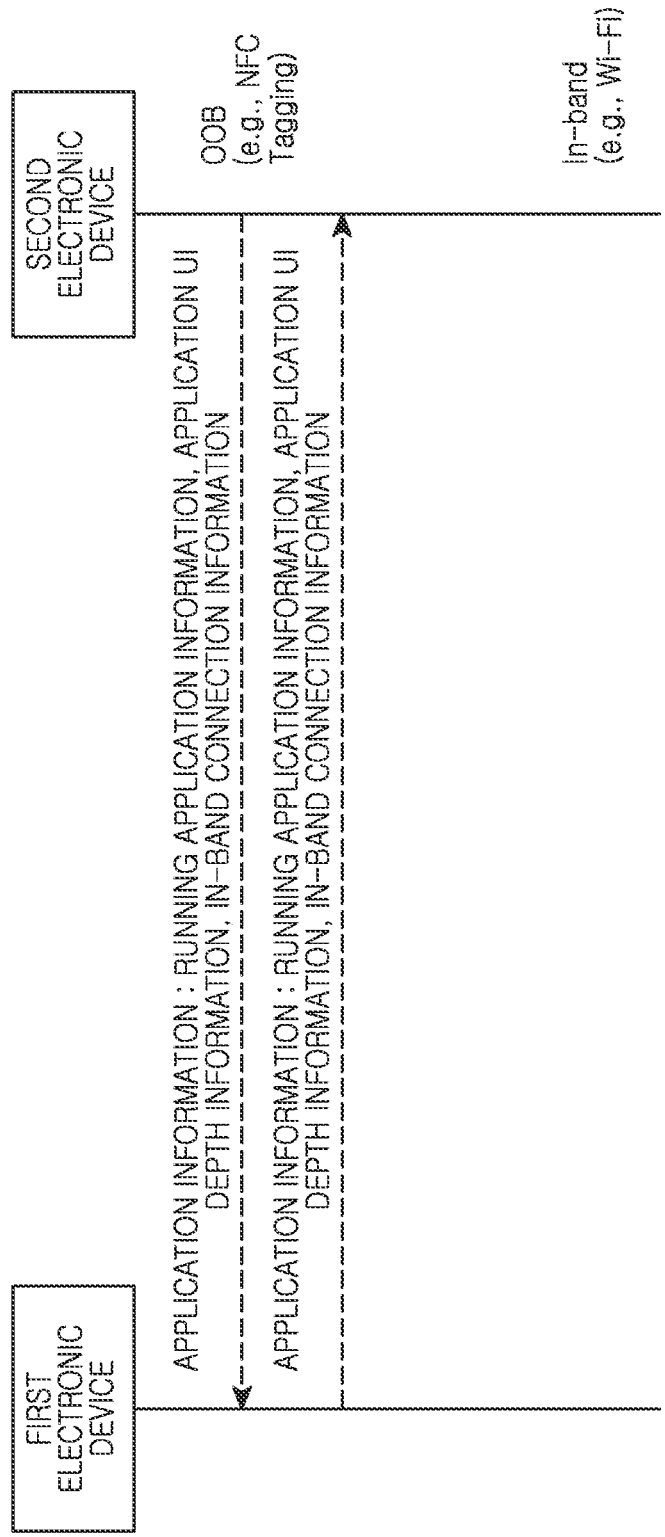
FIG. 5 illustrates data transmission and reception between an electronic device and another electronic device according to an embodiment of the present disclosure.
Figure 11A:
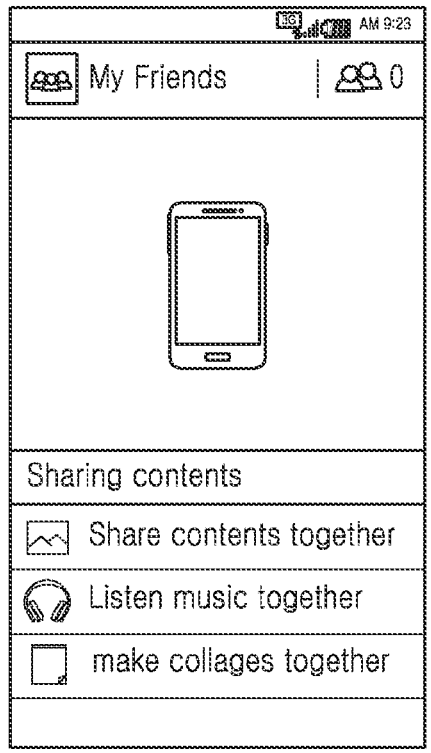
Figure 11A:
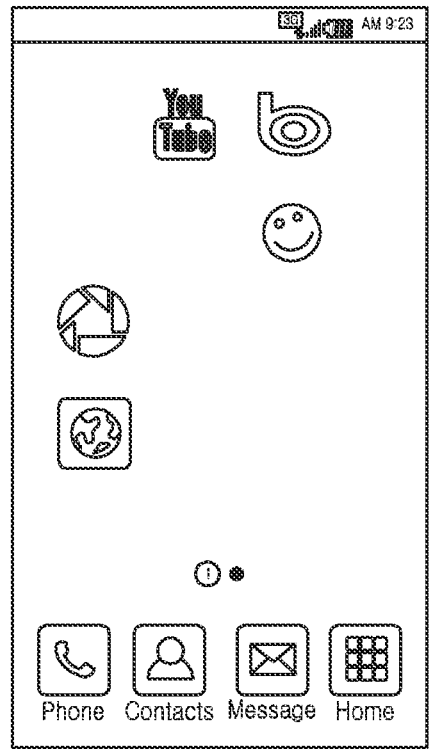
Figure 11B:
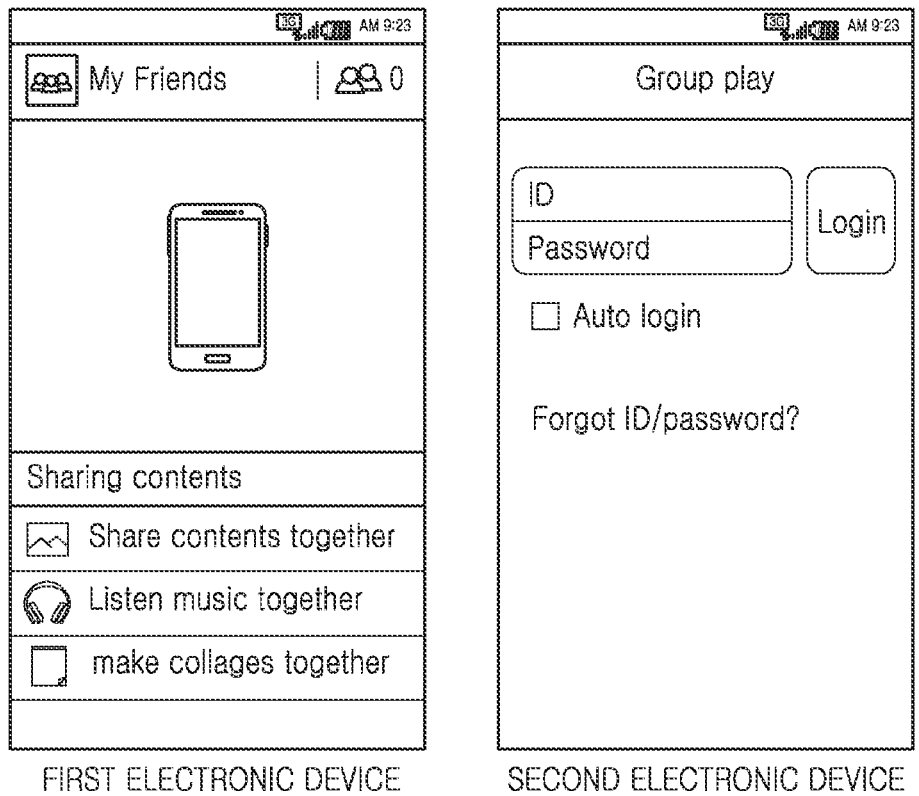
Figure 11C:
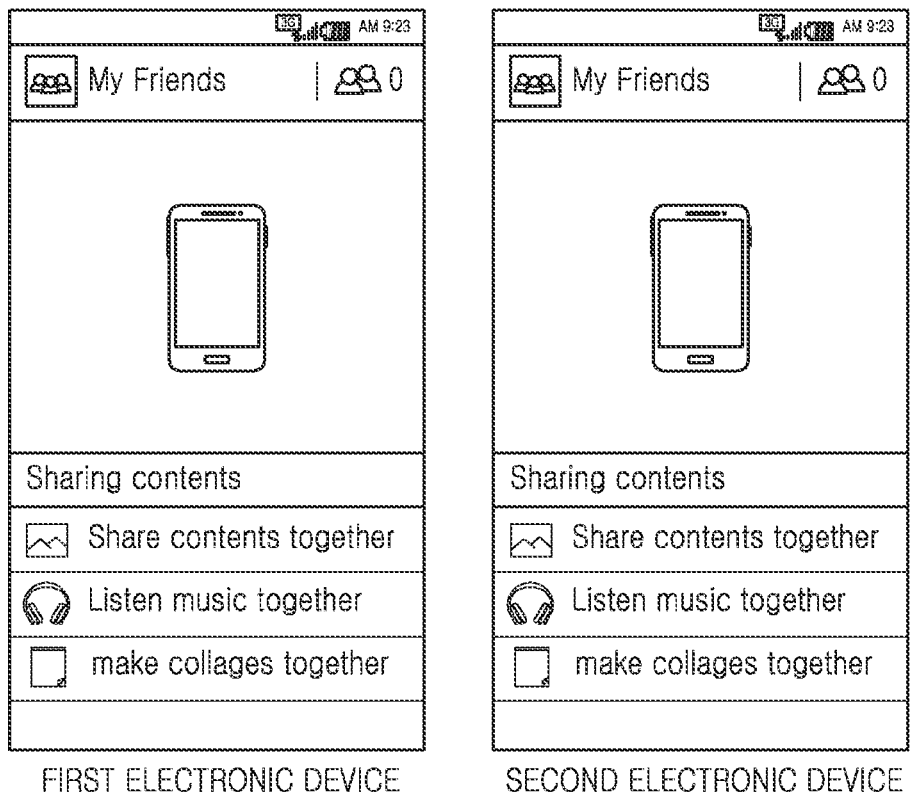
Figure 12A:
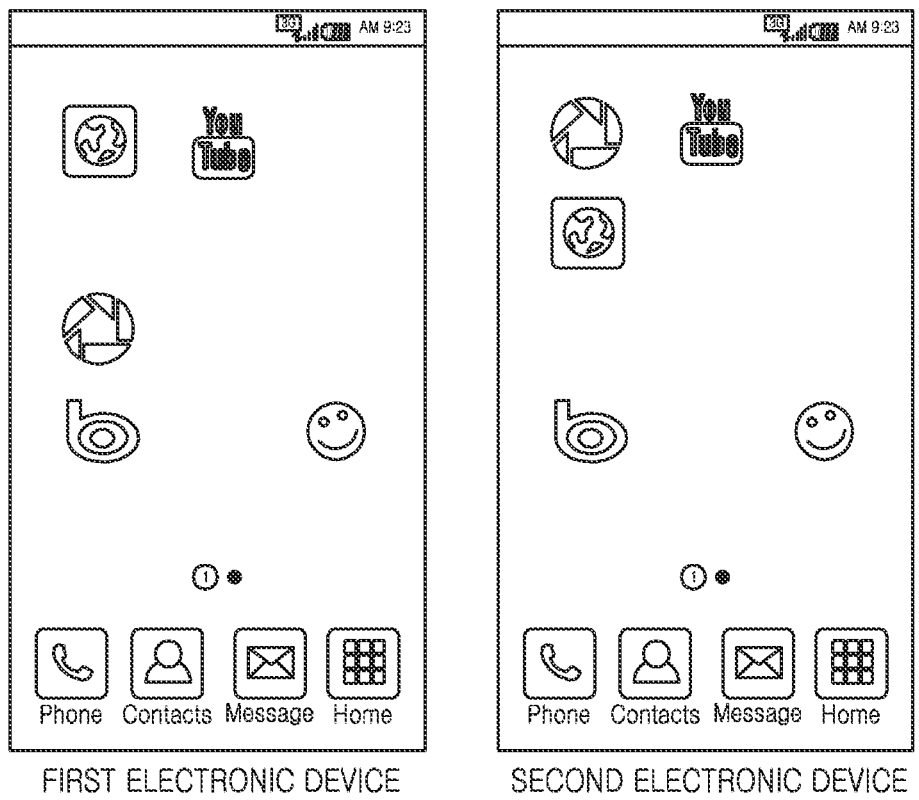
Figure 12B:
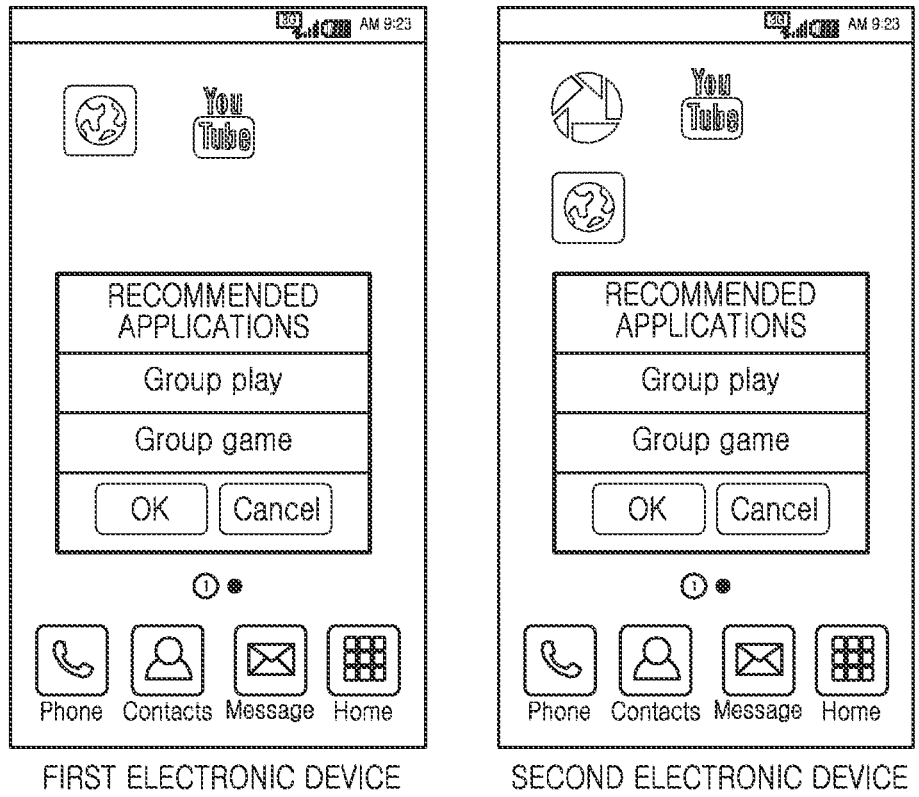
Figure 12C:
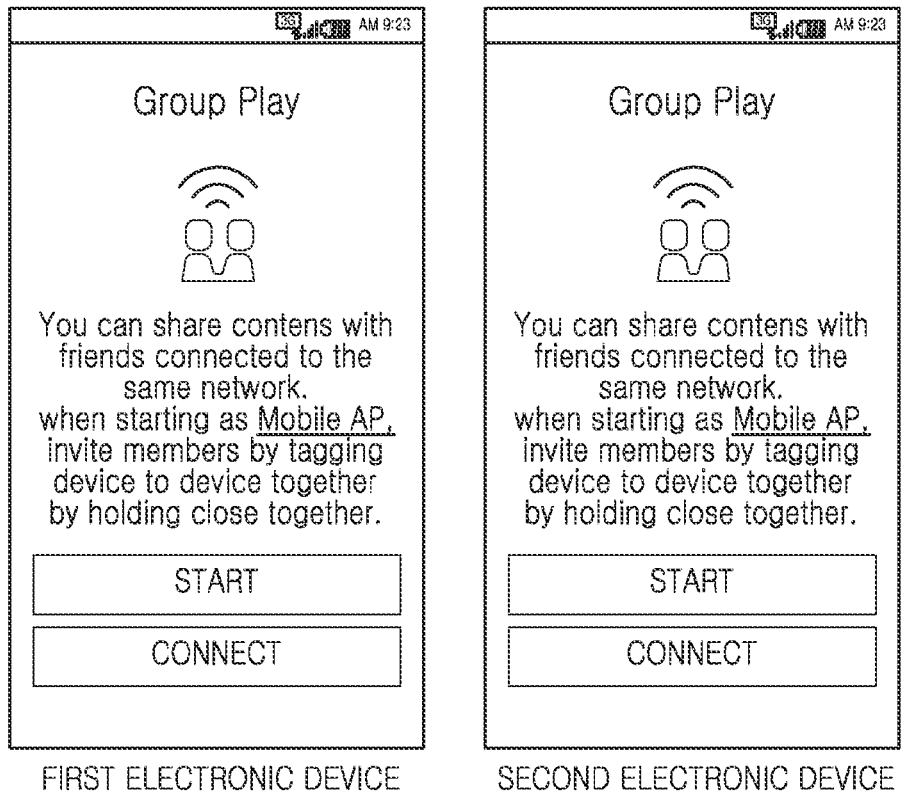
Figure 13:
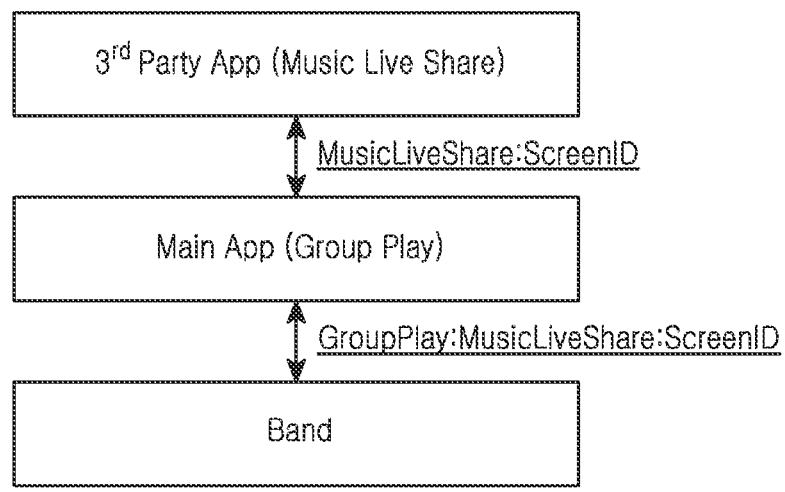
FIG. 13 illustrates two or more same applications executed in an electronic device and another electronic device according to an embodiment of the present disclosure.

FIG. 3 illustrates a method of an electronic device for displaying a same application execution screen as another electronic device according to an embodiment of the present disclosure. FIG. 5 illustrates data transmission and reception between an electronic device and another electronic device according to an embodiment of the present disclosure. FIGS. 6, 7, 8, 9, 10, 11A, 11B, 11C, 12A, 12B, and 12C illustrate a same application execution screen as another electronic device, displayed in an electronic device according to an embodiment of the present disclosure. FIG. 13 illustrates two or more same applications executed in an electronic device and another electronic device according to an embodiment of the present disclosure.

Referring to FIG. 3, at operation 301, the electronic device 100 detects the communication event with the other electronic device. For example, the electronic device 100 can detect the communication event with the other electronic device using the NFC.

At operation 303, the electronic device 100 determines whether the electronic device 100 performs the in-band communication with the other electronic device.

If the electronic device 100 determines that the electronic device 100 performs in-band communication with the other electronic device, the electronic device 100 proceeds to operation 401.

In contrast, if the electronic device 100 determines that the electronic device 100 is not performing in-band communication with the other electronic device, the electronic device 100 proceeds to operation 305 at which the electronic device 100 sends the application information including the in-band information to the other electronic device using the OOB communication. For example, if the electronic device 100 is not in the in-band communication with the other electronic device, the electronic device 100 sends the application information including the in-band information to the other electronic device using the OOB communication so as to allow the in-band communication later.

At operation 307, the electronic device 100 receives the application information including the in-band information from the other electronic device using the OOB communication. According to various embodiments of the present disclosure, operation 307 may precede operation 305 or may coincide with operation 305 according to the design. More specifically, the electronic device 100 can send the running application information to the other electronic device, and receive the running application information of the other electronic device from the other electronic device. For example, a first electronic device can send and receive the application information to and from a second electronic device using the OOB communication, and the application information includes the ID or the name of the running application, the application UI depth information, and the in-band information as illustrated in FIG. 5. The first electronic device can send and receive data to and from the second electronic device by establishing the in-band connection based on the in-band information of the application information exchanged through the OOB messages.

At operation 309, the electronic device 100 determines whether UI depth information thereof is higher than the UI depth information of the other electronic device.

Figure 6:
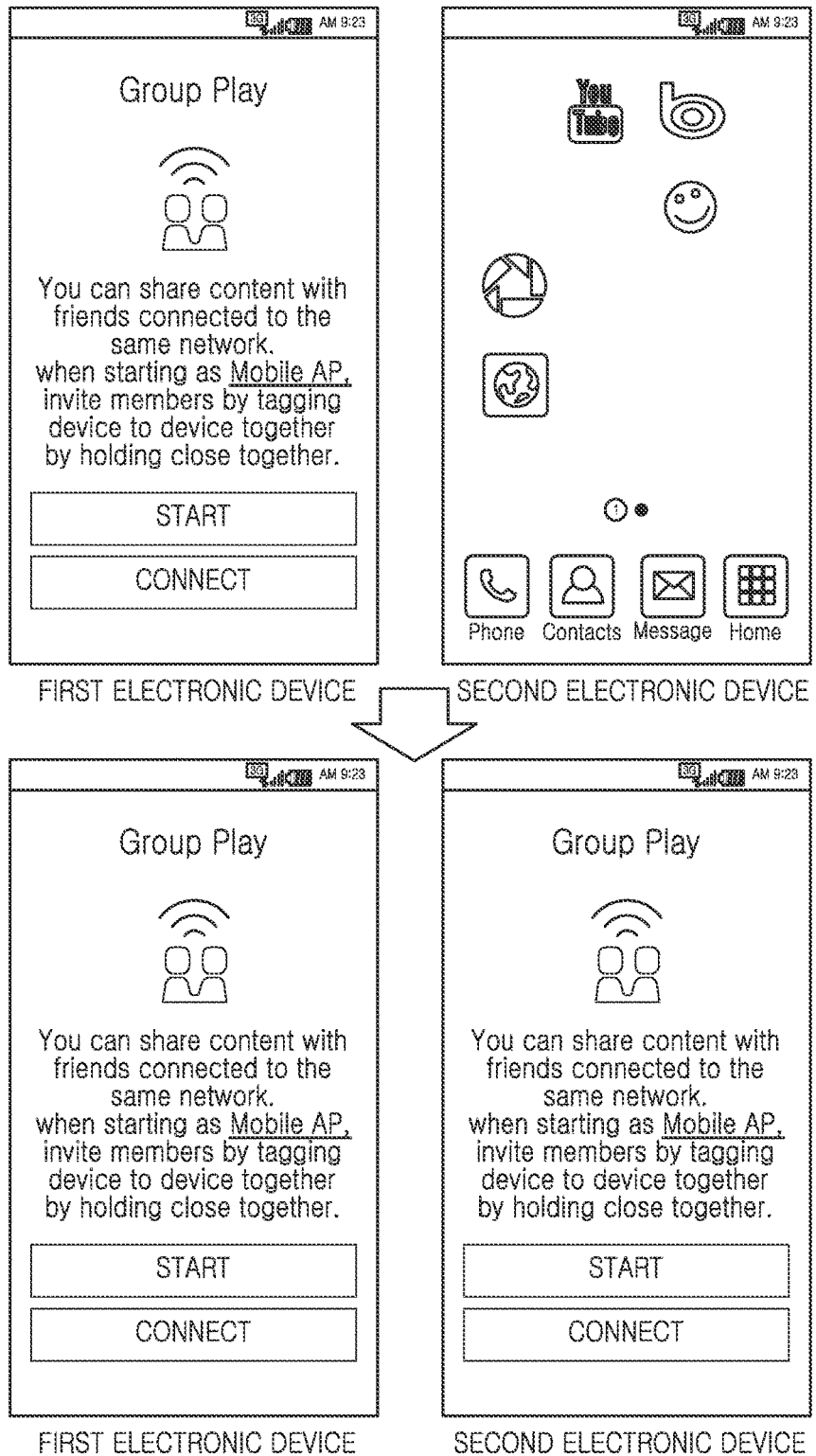
FIGS. 6, 7, 8, 9, 10, 11A, 11B, 11C, 12A, 12B, and 12C illustrate a same application execution screen as another electronic device, displayed in an electronic device according to an embodiment of the present disclosure.
Figure 7:
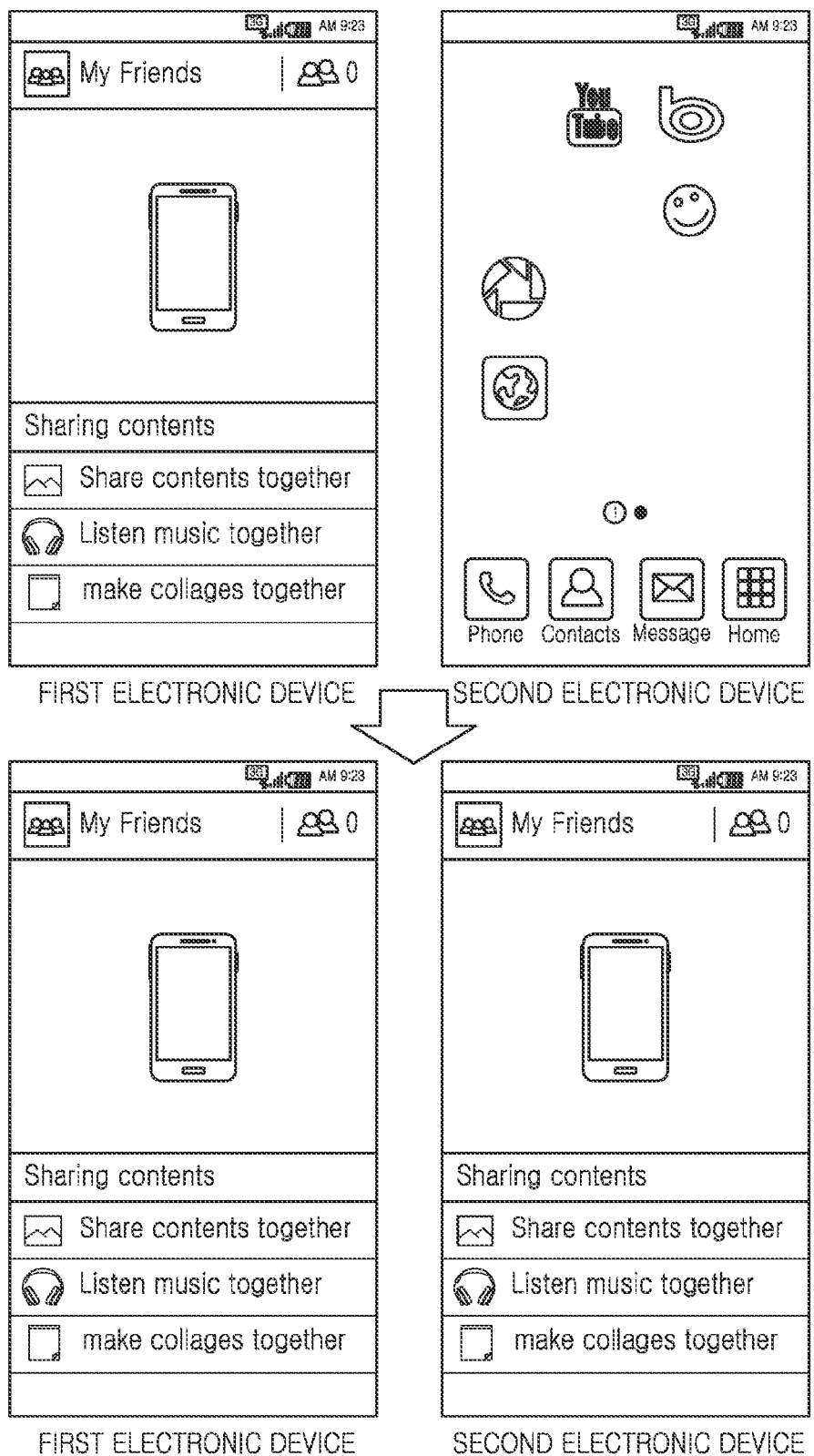

If the electronic device 100 determines that the UI depth information of the electronic device 100 is higher than the UI depth information of the other electronic device at operation 309, then the electronic device 100 proceeds to operation 311 at which the electronic device 100 displays the application execution screen based on UI depth information thereof. For example, as illustrated in FIG. 6, if the first electronic device executes group play with the UI depth information 1 and the second electronic device is not running the application, the first electronic device and the second electronic device can determine the clear intention for executing the group play, execute the group play, and then display the execution screen corresponding to the UI depth information 1. According to various embodiments of the present disclosure, the first electronic device can maintain the current screen without changing the screen. For example, as illustrated in FIG. 7, if the first electronic device executes group play with the UI depth information 2 and the second electronic device is not running the application, the first electronic device and the second electronic device can determine the clear intention for executing the group play, execute the group play, and then display the execution screen corresponding to the UI depth information 2. The first electronic device can maintain the current screen without changing it.

Figure 8:
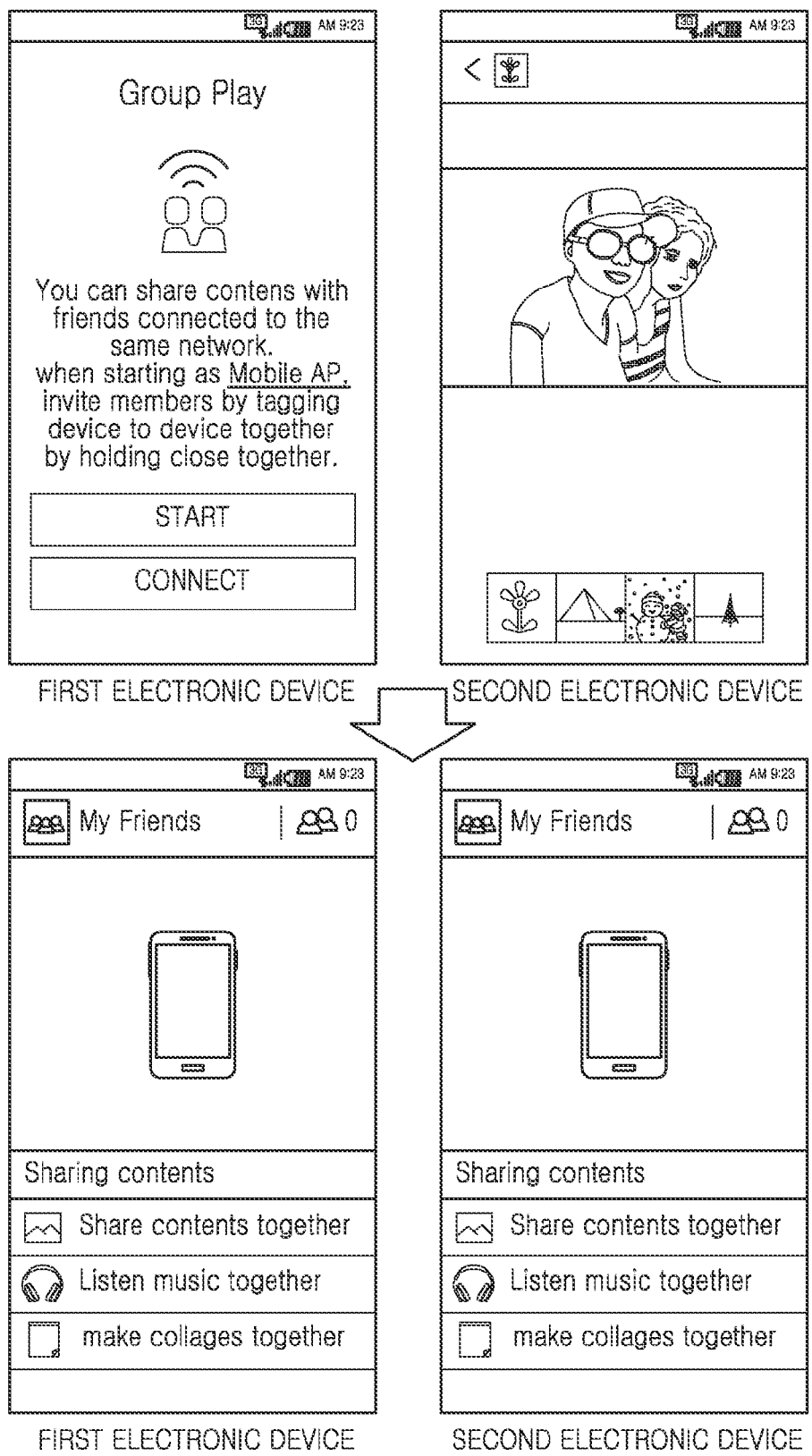

If two electronic devices are running different applications according to the comparison of the application information of the electronic device 100 and the application information received from the other electronic device, the electronic device 100 can provide the application selection option and execute the selected application under the user control. For example, as illustrated in FIG. 8, if the first electronic device executes group play with the UI depth information 1 and the second electronic device is running gallery with the UI depth information 2, the electronic device 100 can request the user to select either the group play or the gallery, select the group play under the user control, and execute the selected group play. For example, the first electronic device and the second electronic device can compare the UI depth information 1 of the group play with the minimum required UI depth information 2, and display the group play execution screen corresponding to the UI depth information 2 according to the comparison. According to various embodiments of the present disclosure, the electronic device 100 can display a graphic effect for requesting to select at least one of the applications running on the electronic device 100 and the other electronic device. For example, the electronic device 100 can display the popup message for the application selection.

The electronic device 100 can compare application information thereof with the application information received from the other electronic device. If the electronic device 100 and the other electronic device are not running the application, the electronic device 100 can provide the application recommendation list concurrently available for the electronic device 100 and the other electronic device. For example, as illustrated in FIGS. 12A, 12B, and 12C, if the electronic device 100 and the other electronic device are not running the application, the electronic device 100 can display the application recommendation list including Group Play and Group Game concurrently available to the electronic device 100 and the other electronic device. Next, if the electronic device 100 and the other electronic device select the application on the application recommendation list, the electronic device 100 can execute the selected application. The electronic device 100 can identify the running application at the top level and determine whether the current application is running. For example, if checking (e.g., determining) the name of the application running at the top level and detecting "Launcher" in the application name, the electronic device 100 can determine that the electronic device 100 is in the idle mode in which the current application is not running. For example, if checking (e.g., determining) Manifest of the application running at the top level and detecting "Launcher" attribute in the Manifest, the electronic device 100 can determine that the electronic device 100 is in the idle mode in which the current application is not running. The Launcher can be the application for controlling the function relating to the application execution. Although the electronic device 100 determines that the electronic device 100 is in the idle mode based on, but not limited to, the Android platform, the electronic device 100 may determine the idle mode based on other platforms installed to the electronic device 100. For example, if the electronic device 100 checks (e.g., determines) the name of the application running at the top level on Windows platform and the application name includes "background", the electronic device 100 can determine that the electronic device 100 is in the idle mode in which the application is not running. According to various embodiments of the present disclosure, the electronic device 100 may determine whether the electronic device 100 is operating in an idle mode. For example, the electronic device 100 may determine whether the electronic device 100 is operating in an idle mode based on an application running at the top level. The electronic device 100 may determine whether the electronic device 100 is operating in an idle mode for various operating environments (e.g., Android, Windows, and/or the like).

Figure 9:
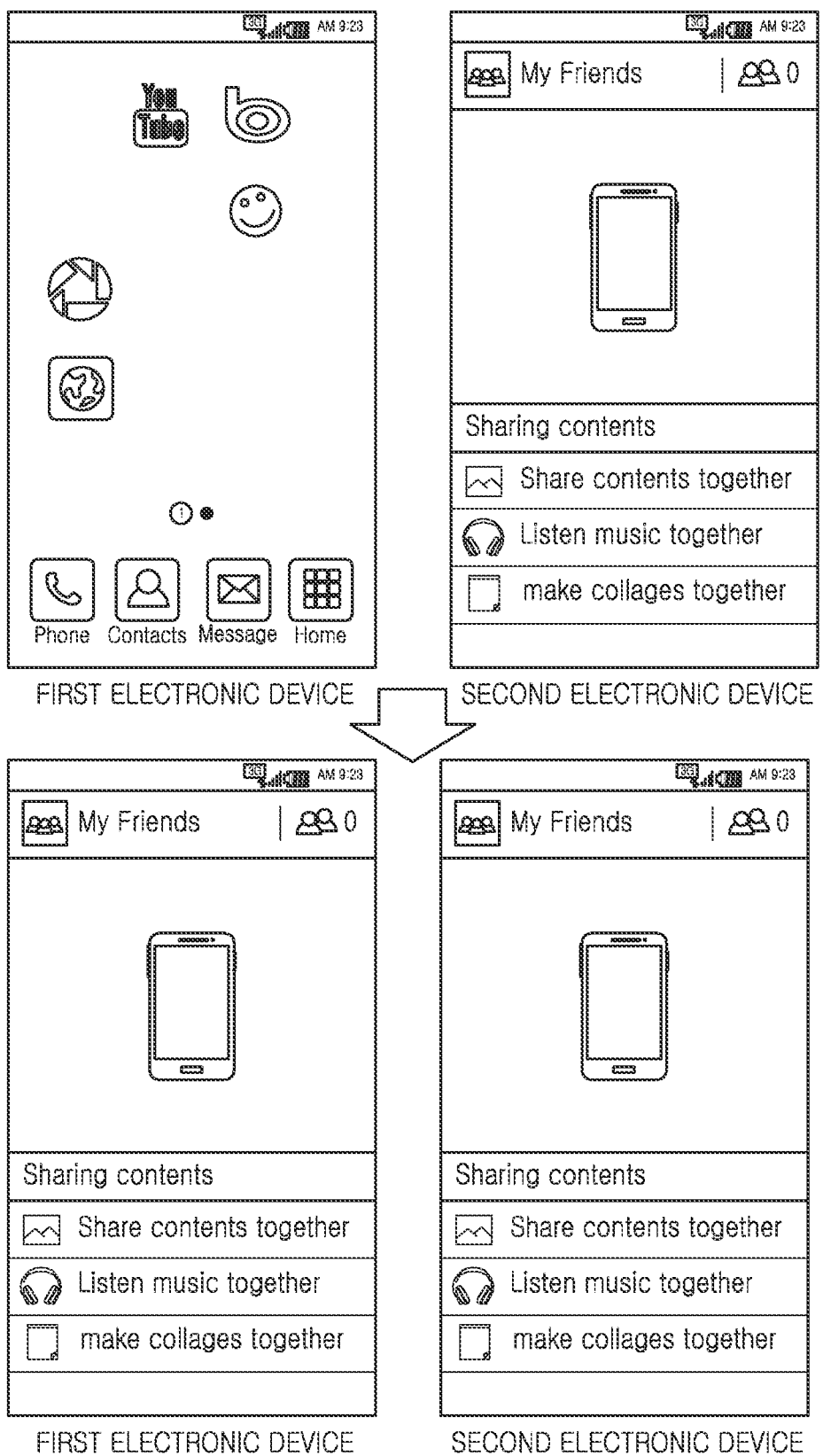
Figure 10:
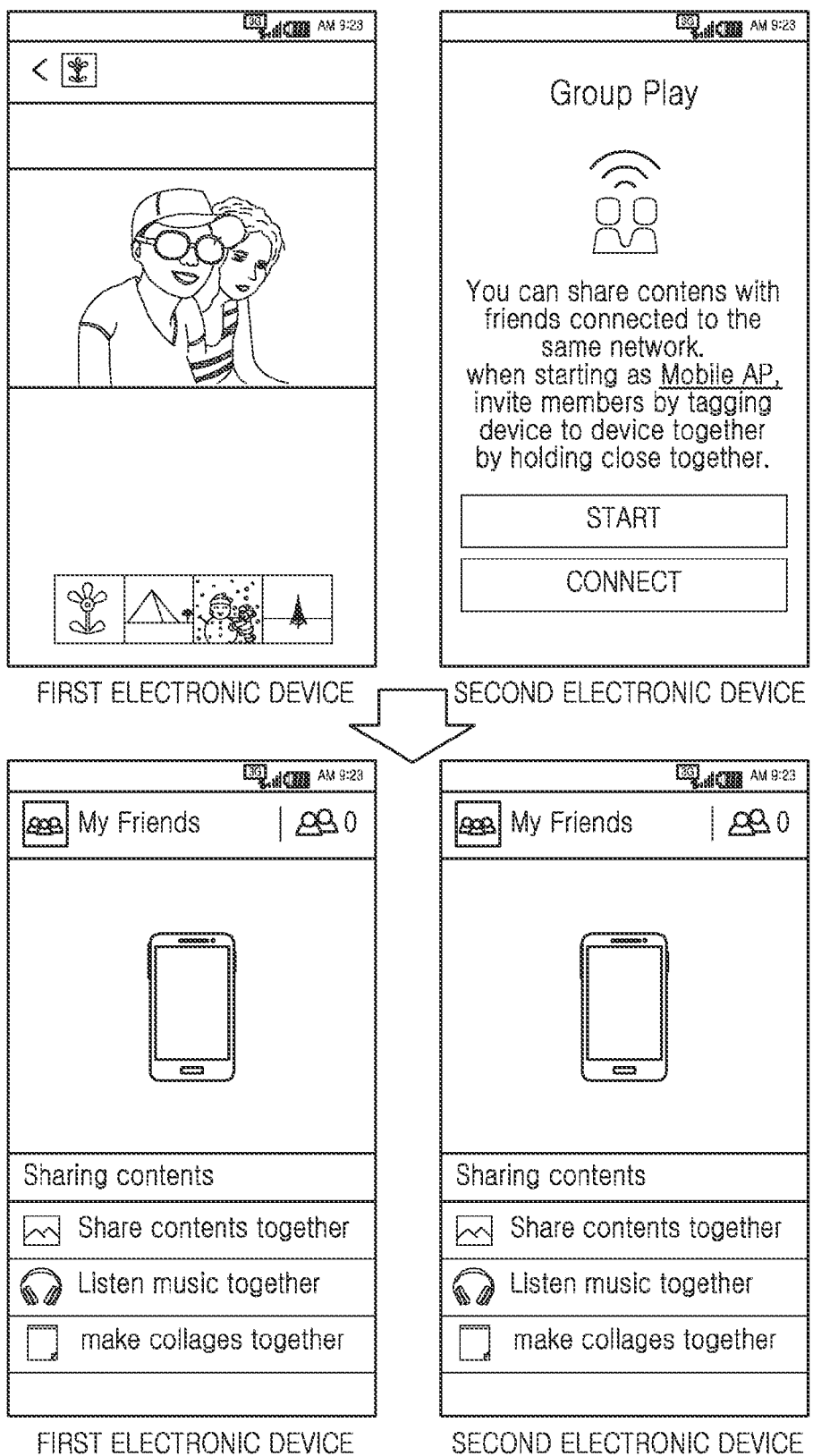

In contrast, if the electronic device 100 determines that the UI depth information of the electronic device 100 and is lower than the UI depth information of the other electronic device at operation 309, then the electronic device 100 proceeds to operation 313 at which the electronic device 100 can display the application execution screen based on the UI depth information received from the other electronic device. For example, as illustrated in FIG. 9, if the second electronic device executes the group play with the UI depth information 2 and the first electronic device is not running the application, the first electronic device and the second electronic device can determine the clear intention for the group play, execute the group play, and then display the execution screen corresponding to the UI depth information 2. If analyzing the application information of the electronic device 100 and the application information received from the other electronic device and determining different applications running, the electronic device 100 can provide the application selection option and execute the application under the user control. For example, as illustrated in FIG. 10, if the first electronic device runs the gallery with the UI depth information 2 and the second electronic device runs the group play with the UI depth information 1, the electronic device 100 can provide the selection option and execute the application under the user control. In so doing, the first electronic device and the second electronic device can compare the UI depth information 1 of the group play with the minimum required UI depth information 2, and display the group play execution screen corresponding to the UI depth information 2 according to the comparison. If a particular function is required to display the execution screen corresponding to the UI depth information, the electronic device 100 can provide the function mapped to the corresponding UI depth information, execute the corresponding function under the user control, and then display the execution screen corresponding to the UI depth information. For example, as illustrated in FIG. 11A, if the first electronic device runs the group play with the UI depth information 2 and the second electronic device is not running the application, the first electronic device and the second electronic device can determine the clear intention for the group play, execute the group play, and then display the execution screen corresponding to the UI depth information 2. According to various embodiments of the present disclosure, if login is required to display the execution screen corresponding to the UI depth information 2, the second electronic device can display the login screen as illustrated in FIG. 11B, perform the login process according to the log information input from the user, and display the execution screen corresponding to the UI depth information 2 as illustrated in FIG. 11C. According to various embodiments of the present disclosure, the second electronic device can provide the auto login option. If the user logs in with the auto login option selected, the second electronic device can display the execution screen corresponding to the UI depth information without any login process.

At operation 315, the electronic device 100 connects to the other electronic device using the exchanged in-band information. In so doing, the electronic device 100 can establish the in-band connection using the in-band information exchanged in advance. For example, the electronic device 100 can establish the Wi-Fi connection using Wi-Fi connection information exchanged in advance. Next, the electronic device 100 finishes this process.

Figure 4:
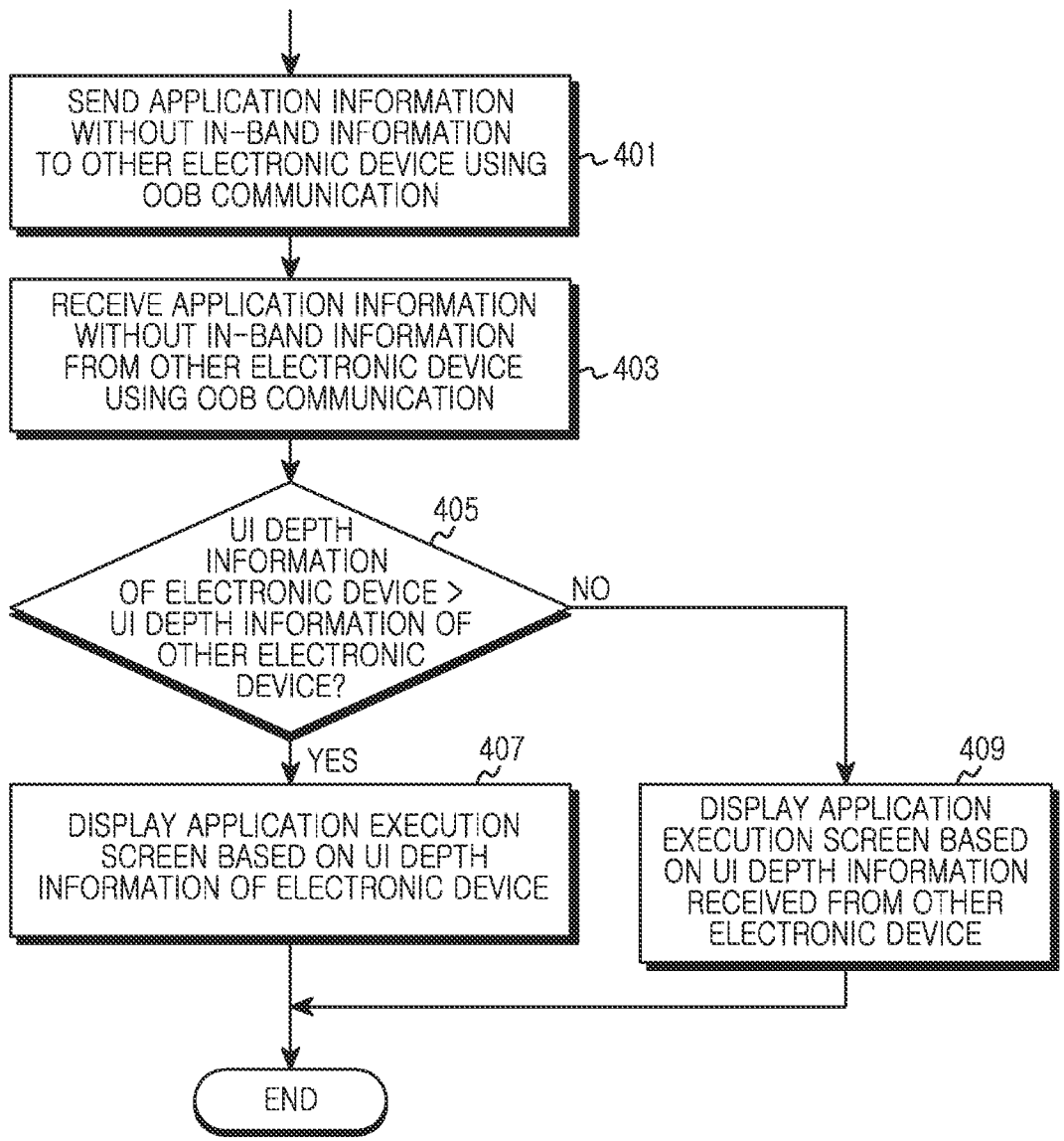
FIG. 4 illustrates a method of an electronic device for displaying a same application execution screen as another electronic device according to an embodiment of the present disclosure.

FIG. 4 illustrates a method of an electronic device for displaying a same application execution screen as another electronic device according to an embodiment of the present disclosure.

Referring to FIG. 4, at operation 401, the electronic device 100 can send the application information without the in-band information to the other electronic device using the OOB communication.

At operation 403, the electronic device 100 can receive the application information without the in-band information from the other electronic device using the OOB communication. For example, because the electronic device 100 is already communicating with the other electronic device using the in-band communication, the electronic device 100 can send and receive the application information without the in-band information for the in-band connection.

At operation 405, the electronic device 100 determines whether UI depth information thereof is higher than the UI depth information of the other electronic device.

If the electronic device 100 determines that the UI depth information of the electronic device 100 is higher than the UI depth information of the other electronic device at operation 405, then the electronic device 100 proceeds to operation 407 at which the electronic device 100 displays the application execution screen based on UI depth information of the electronic device 100. For example, as illustrated in FIG. 6, if the first electronic device executes the group play with the UI depth information 1 and the second electronic device is not running the application, the first electronic device and the second electronic device can determine the clear intention for the group play, execute the group play, and then display the execution screen corresponding to the UI depth information 1. According to various embodiments of the present disclosure, the first electronic device can maintain the current screen without changing the current screen. For example, as illustrated in FIG. 7, if the first electronic device executes the group play with the UI depth information 2 and the second electronic device is not running the application, the first electronic device and the second electronic device can determine the clear intention for the group play, execute the group play, and then display the execution screen corresponding to the UI depth information 2. The first electronic device can maintain the current screen without changing the screen.

If neither the electronic device 100 or the other electronic device run the application according to the comparison of the application information of the electronic device 100 and the application information received from the other electronic device, the electronic device 100 can provide the application recommendation list concurrently available for the electronic device 100 and the other electronic device. For example, as illustrated in FIGS. 12A, 12B, and 12C, if the electronic device 100 and the other electronic device are not running the application, the electronic device 100 can display the application recommendation list including Group Play and Group Game concurrently available to the electronic device 100 and the other electronic device. Next, if the electronic device 100 and the other electronic device select the application on the application recommendation list, the electronic device 100 can execute the selected application. The electronic device 100 can identify the application running at the top level and determine whether the current application is running. For example, if checking (e.g., determining) the name of the application running at the top level and detecting "Launcher" in the application name, the electronic device 100 can determine that the electronic device 100 is in the idle mode in which the current application is not running currently.

In contrast, if the electronic device 100 determines that the UI depth information of the electronic device 100 is lower than the UI depth information of the other electronic device at operation 405, then the electronic device 100 proceeds to operation 409 at which the electronic device 100 can display the application execution screen based on the UI depth information received from the other electronic device. If the electronic device 100 and the other electronic device display different applications, the electronic device 100 can execute the application running on the other electronic device and display the corresponding application execution screen according to the UI depth information received from the other electronic device. For example, as illustrated in FIG. 9, if the second electronic device executes the group play with the UI depth information 2 and the first electronic device is not running the application, the first electronic device and the second electronic device can determine the clear intention for the group play, execute the group play, and then display the execution screen corresponding to the UI depth information 2. If analyzing the application information of the electronic device 100 and the application information received from the other electronic device and determining different applications running, the electronic device 100 can provide the application option and execute the application under the user control. For example, as illustrated in FIG. 10, if the first electronic device runs the gallery with the UI depth information 2 and the second electronic device runs the group play with the UI depth information 1, the electronic device 100 can provide the selection option and execute the application under the user control. The first electronic device and the second electronic device can compare the UI depth information 1 of the group play with the minimum required UI depth information 2, and display the group play execution screen corresponding to the UI depth information 2 according to the comparison. If a particular function is required to display the execution screen corresponding to the UI depth information, the electronic device 100 can provide the function mapped to the corresponding UI depth information, execute the corresponding function under the user control, and then display the execution screen corresponding to the UI depth information. For example, as illustrated in FIG. 11A, if the first electronic device runs the group play with the UI depth information 2 and the second electronic device is not running the application, the first electronic device and the second electronic device can determine the clear intention for the group play, execute the group play, and then display the execution screen corresponding to the UI depth information 2. According to various embodiments of the present disclosure, if the login is required to display the execution screen corresponding to the UI depth information 2, the second electronic device can display the login screen as illustrated in FIG. 11B, perform the login process according to the log information input from the user, and display the execution screen corresponding to the UI depth information 2 as illustrated in FIG. 11C. According to various embodiments of the present disclosure, the second electronic device can provide the auto login option. If the user logs in with the auto login option selected, the second electronic device can display the execution screen corresponding to the UI depth information without any login process. Next, the electronic device 100 can finish this process.

Although not illustrated in FIGS. 3 and 4, if communicating with a particular electronic device and detecting the communication event with other electronic device, the electronic device 100 can determine whether to send the application information by comparing a group ID thereof with the group ID of the other electronic device detected. For example, if the ID of the first group including the electronic device 100 is different from the ID of the second group including the other electronic device, the electronic device 100 can provide the selection option asking (e.g., prompting a user to indicate) whether to execute which one of the application running on the first group and the second group, without sending the application information to the other electronic device. Next, the first group and the second group can run the same application according to the selected option. For example, if detecting no group ID of the other electronic device, the electronic device 100 can send the running application information to the other electronic device.

If detecting the communication event with the other electronic device, the electronic device 100 can receive the message including the main application and 3$^{rd}$ party application information from the other electronic device. For example, as illustrated in FIG. 13, if receiving the message in the form of Group Play:MusicLiveShare:Screen ID through the band service, the electronic device 100 can confirm the main application name "Group Play", execute Group Play, identify the 3$^{rd}$ party application name "MusicLiveShare", and execute the identified "MusicLiveShare". In so doing, the electronic device 100 can display "Group Play" and "MusicLiveShare" based on the UI depth information of Screen ID. Although the message about, but not limited to, the two applications (the main application and the 3$^{rd}$ party application subordinate to the main application) is received and the two applications are executed, a message about two or more applications can be received and the corresponding applications can be executed.

Various embodiments and various functional operations of the present disclosure described herein can be implemented in computer software, firmware, hardware, or in combinations of one or more of computer software, firmware, and hardware including the structures disclosed in this specification and structural equivalents thereof. Various embodiments of the present disclosure can be implemented as one or more computer program products. For example, various embodiments of the present disclosure may be implemented as one or more data processors. As another example, one or more modules of computer program instructions encoded on a non-transient computer-readable medium to control the devices.

The non-transient computer-readable medium may be a machine-readable storage medium, a machine-readable storage substrate, a memory device, a material affecting a machine-readable propagated stream, or a combination of one or more of these. The term 'data processor' encompasses every device, apparatus, and machine including, for example, a programmable processor, a computer, a multiple processors, or a computer, for processing data. The device can be added to the hardware and include a program code for creating an execution environment of a corresponding computer program, for example, a code for constituting processor firmware, a protocol stack, a database management system, an operating system, or a combination of one or more of these.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in a first electronic device for communicating with a second electronic device, the method comprising:
   detecting a communication event of the second electronic device;
   upon detecting the communication event, if the first electronic device does not communicate with the second electronic device using an in-band communication, transmitting, to the second electronic device, application information for a first application running on the first electronic device and first information for the in-band communication using an out-of-band communication;
   receiving, from the second electronic device, application information for a second application running on the second electronic device and second information for the in-band connection using the out-of-band communication;
   determining an application to be run on the first electronic device by comparing an application identifier included in each of the application information for the first application and the application information for the second application; and
   displaying one of an application execution screen for the first application and another application execution screen for the second application according to result of comparing user interface (UI) depth information included in each of the application information for the first application and the application information for the second application, the UI depth information indicating progress of an application execution screen for an application executed in each of the first electronic device and the second electronic device.

2. The method of claim 1, further comprising:
   determining whether the first application and the second application are the same application by comparing the application identifier of the first application and the application identifier of the second application;
   upon determining that the first application and the second application are the same application, determining a highest UI depth information by comparing the UI depth information of the first application with the UI depth information of the second application; and
   setting a screen corresponding to the determined UI depth information to the application execution screen.

3. The method of claim 1, further comprising:
   determining whether the first application and the second application are the same application by comparing the application identifier of the first application and the application identifier of the second application;
   upon determining that the first application is different from the second application, determining one application by detecting a user input; and
   setting a screen corresponding to the determined application UI depth information to the application execution screen.

4. The method of claim 1, further comprising:
   upon detecting that the application information for the first application indicates no application running on the first electronic device, setting a screen corresponding to the application UI depth information of the second application, to the application execution screen.

5. The method of claim 1, further comprising:
   determining whether the first electronic device already communicates with the second electronic device using the in-band communication.

6. The method of claim 5, further comprising:
connecting the communication to the second electronic device using the in-band connection information.

7. The method of claim 1, further comprising:
upon detecting the communication event, transmitting a group identifier (ID) of the first electronic device;
receiving a group ID from the second electronic device; and
determining whether the first electronic device and the second electronic device belong to different groups by comparing the group ID of the first electronic device with the group ID of the second electronic device.

8. The method of claim 7, further comprising:
determining that the first electronic device and the second electronic device belong to different groups;
determining whether the first application and the second application are the same application by comparing the application identifier of the first application and the application identifier of the second application;
upon determining that the first application is different from the second application, displaying a message requesting to select one application to be run on the first electronic device and one application to be run on the second electronic device; and
setting an execution screen of the selected application.

9. A first electronic device for communicating with a second electronic device, the first electronic device comprising:
at least one processor;
a display;
at least one transceiver;
a memory; and
at least one program stored in the memory and configured for execution by the at least one processor, wherein the at least one program comprises instructions for:
detecting a communication event with the second electronic device,
upon detecting the communication event, if the first electronic device does not communicate with the second electronic device using an in-band communication, transmitting, to the second electronic device, application information for a first application running on the first electronic device and first information for the in-band communication using an out-of-band communication,
receiving, from the second electronic device, application information for a second application running on the second electronic device and second information for the in-band connecting using the out-of-band communication,
determining an application to be run on the first electronic device by comparing an application identifier included in each of the application information for the first application and the application information for the second application, and
displaying one of an application execution screen for the first application and another application execution screen for the second application according to result of comparing user interface (UI) depth information included in each of the application information for the first application and the application information for the second application, the UI depth information indicating progress of an application execution screen for an application executed in each of the first electronic device and the second electronic device.

10. The device of claim 9, wherein the at least one program further comprises instructions for:
determining whether the first application and the second application are the same application by comparing the application identifier of the first application and the application identifier of the second application,
upon determining that the first application and the second application are the same application, determining a highest UI depth information by comparing the UI depth information of the first application with the UI depth information of the second application, and
setting a screen corresponding to the determined UI depth information to the application execution screen.

11. The device of claim 9, wherein the at least one program further comprises instructions for:
determining whether the first application and the second application are the same application by comparing the application identifier of the first application and the application identifier of the second application,
upon determining that the first application is different from the second application, determining one application by detecting a user input, and
setting a screen corresponding to the determined application UI depth information to the application execution screen.

12. The device of claim 9, wherein the at least one program further comprises an instruction for, upon identifying that the application information received for the first application indicates no application running on the first electronic device, setting a screen corresponding to the application UI depth information of the second application to the application execution screen.

13. The device of claim 9, wherein the at least one program further comprises instructions for
determining whether the first electronic device already communicates with the second electronic device using the in-band communication.

14. The device of claim 13, wherein the at least one program further comprises an instruction for connecting the communication to the second electronic device using the in-band connection information.

15. The device of claim 9, wherein the at least one program further comprises instructions, upon detecting the communication event, for:
transmitting a group identifier (ID) of the first electronic device, for receiving a group ID from the second electronic device, and
determining whether the first electronic device and the second electronic device belong to different groups by comparing the group ID of the first electronic device with the group ID of the second electronic device.

16. The device of claim 15, wherein the at least one program further comprises instructions for:
determining whether the first application and the second application are the same application by comparing the application identifier of the first application and the application identifier of the second application,
displaying a message requesting to select one application to be run on the first electronic device and one application to be run on the second electronic device upon determining that the first application is different from the second application, and
setting an execution screen of the selected application.

* * * * *